United States Patent
Duba et al.

[11] Patent Number: 5,933,339
[45] Date of Patent: Aug. 3, 1999

[54] MODULAR STATIC POWER CONVERTER CONNECTED IN A MULTI-LEVEL, MULTI-PHASE, MULTI-CIRCUIT CONFIGURATION

[75] Inventors: Greg A. Duba, New London, Conn.; Edgar S. Thaxton, Bradford, R.I.; John Walter, Niantic, Conn.

[73] Assignee: Electric Boat Corporation, Groton, Conn.

[21] Appl. No.: 09/046,076

[22] Filed: Mar. 23, 1998

[51] Int. Cl.$^6$ .................................................. H02M 7/00
[52] U.S. Cl. ................................. 363/71; 363/41
[58] Field of Search ................. 363/71, 41, 132; 388/811

[56] References Cited

U.S. PATENT DOCUMENTS

| | | |
|---|---|---|
| 3,609,507 | 9/1971 | Beck . |
| 3,622,863 | 11/1971 | King . |
| 3,636,430 | 1/1972 | Kernick et al. . |
| 3,775,663 | 11/1973 | Turnbull . |
| 4,084,221 | 4/1978 | Ogata . |
| 4,173,779 | 11/1979 | Abbondanti et al. . |
| 4,208,621 | 6/1980 | Hipkins et al. . |
| 4,220,896 | 9/1980 | Paice . |
| 4,276,589 | 6/1981 | Okawa et al. . |
| 4,317,166 | 2/1982 | Winkler et al. . |
| 4,349,772 | 9/1982 | Weiss . |
| 4,370,703 | 1/1983 | Risberg . |
| 4,500,821 | 2/1985 | Bitting et al. . |
| 4,674,024 | 6/1987 | Paice et al. . |
| 4,730,150 | 3/1988 | Lee et al. . |
| 4,779,034 | 10/1988 | Shepard, Jr. . |
| 4,928,042 | 5/1990 | Harms et al. . |
| 4,947,100 | 8/1990 | Dhyanchand et al. .......... 363/71 |
| 5,031,088 | 7/1991 | Tanaka . |
| 5,221,881 | 6/1993 | Cameron . |
| 5,317,498 | 5/1994 | Dhyandchand et al. . |
| 5,334,921 | 8/1994 | Wehberg . |
| 5,337,227 | 8/1994 | Stacey et al. . |
| 5,373,436 | 12/1994 | Yamaguchi et al. . |
| 5,426,354 | 6/1995 | Bausch . |
| 5,491,393 | 2/1996 | Uesugi . |
| 5,515,264 | 5/1996 | Stacey . |
| 5,552,685 | 9/1996 | Young et al. . |
| 5,625,545 | 4/1997 | Hammond . |
| 5,703,767 | 12/1997 | Stacey ....................................... 363/40 |
| 5,757,633 | 5/1998 | Bowles ....................................... 363/71 |

*Primary Examiner*—Shawn Riley
*Attorney, Agent, or Firm*—Baker & Botts LLP

[57] ABSTRACT

In the particular embodiments described, an unlimited voltage static power converter includes an array of multi-level phase drivers consisting of a plurality of H-bridge power modules connected in series. The midpoint node of the series-connected power semiconductors is connected to corresponding midpoint nodes in adjacent H-bridges to achieve a desired high output voltage using available power switch ratings. A three-dimensional multi-level, multi-phase, multi-circuit array of H-bridges permits the use of the static power converter for high power applications, while providing a high degree of power quality. The power semiconductor switches are operated in accordance with a two-dimensional interleaved pulse width modulation algorithm which produces a waveform with a switching frequency that can be more than an order of magnitude higher than the switching frequency of a single power switch. PWM complementary triangle carrier waves are used for individual PWM control of each H-bridge in each multi-level phase driver, resulting in a two-dimensional interleaved control algorithm. Injection of harmonic or non-harmonic content into the PWM reference waveform further reduces harmonic and non-harmonic content of the output voltage waveforms. Part-load efficiency is increased using unique load partitioning methods, five of which are described herein.

46 Claims, 17 Drawing Sheets

MODULAR STATIC POWER CONVERTER CONNECTED IN A MULTI-LEVEL, MULTI-PHASE, MULTI-CIRCUIT CONFIGURATION

BACKGROUND OF THE INVENTION

This invention relates to static power converter arrangements and, more particularly, to a static power converter arrangement to provide unlimited voltage.

Conventional static power converter arrangements are limited by the shortcomings of available power semiconductor devices. Direct parallel and/or series operation of power semiconductor devices requires excessive device derating and careful matching of the devices to ensure voltage and current sharing and thermal stability.

The Paice et al. U.S. Pat. No. 4,674,024 discloses a medium voltage modular inverter and control system for a variable frequency inverter motor drive in which low voltage inverter modules are combined to form a medium voltage multi-inverter system by connecting standard modules having an H-bridge of semiconductor switches supplied by isolated individual DC power sources in a string and connecting strings of such inverter modules in a wye formation to provide pulse width modulated power to control the variable speed motor without requiring an output transformer.

The Hammond U.S. Pat. No. 5,625,545 discloses an electric drive apparatus using input transformers with multiple, phase-shifted, isolated secondaries, each feeding an isolated power module, the modules being connected in series to achieve a high output motor voltage. Control of the power modules is achieved via nonmal and complementary triangle waves compared with an externally generated reference wave. Triangle waves for serially connected modules are delayed in time from other triangle waves in that module string.

The Weiss U.S. Pat. No. 4,349,772 discloses a DC inverter power supply using plural inverter circuits in which less than all of the inverter circuits are included in the power supply when the motor torque requirement is reduced.

The Stacey U.S. Pat. No. 5,515,264 discloses a method for harmonic neutralization of an electric drive by a plurality of 6-pulse bridges coupled to a common DC source. Quasi-hanmonic neutralization inverter systems providing up to 120 pulses, using zigzag interphase transformers at the outputs of each 6-pulse bridge, are disclosed. A successive staggering technique for harmonic neutralization using interphase transformers is disclosed in the Stacey et al. U.S. Pat. No. 5,337,227. In addition, the Bausch U.S. Pat. No. 5,426,354 discloses an H-bridge configuration of power transistors which generate pulse width modulated voltage waveforms which are in turn supplied to various phase terminals of the stator of a motor.

In each of the prior art arrangements, however, the semiconductor power transistors are operated in a two-dimensional arrangement in accordance with a one-dimensional pulse width modulated control algorithm. Moreover, in those arrangements, the semiconductor power transistors are operated at less than maximum efficiency, especially when reduced power is required from the system.

SUMMARY OF THE INVENTION

Accordingly it is an object of the present invention to provide an unlimited voltage, high power static power converter arrangement which overcomes disadvantages of the prior art.

Another object of the invention is to provide a static power converter arrangement for supplying multi-phase, multi-circuit power to a multi-phase, multi-circuit configured load.

A further object of the invention is to provide arrangement for control of a multi-phase, multi-circuit static power converter using a two-dimensional, interleaved control algorithm.

An additional object of the invention is to provide a static power converter arrangement having increased static power converter bandwidth for active output filtering capability.

Another object of the invention is to provide a static power converter arrangement producing unlimited voltage and having a high efficiency for all loads.

Still another object of the invention is to provide a static power converter arrangement by which the harmonic content of both input and output voltage waveforms is reduced.

A further object of the invention is to provide a static power converter in which the harmonic content of the output voltage waveforms is further reduced through the use of harmonic injection in the reference waveforms.

Another object of the invention is to provide a static power converter arrangement in which a method for dynamic braking dissipates harmful regenerative energy from a regenerating motor load.

These and other objects of the invention are attained by providing a static power converter arrangement producing unlimited voltage which includes an array of multi-level phase drivers interconnected in star configuration with one end of the drivers joined at a floating point and the other end connected to circuits of corresponding phases of a multi-phase, multi-circuit load, or mesh configuration with one end of each driver joined to the opposite end of another driver and the resulting connection joined tocircuits of corresponding phases of a multi-phase, multi-circuit load. For three phase systems the interconnection of the drivers may be a wye or delta configuration. Each of the multi-level phase drivers includes a plurality of H-bridges connected in series, with each H-bridge consisting of two pairs of power semiconductors connected in series between positive and negative terminals of a DC power source. The midpoint nodes of the series-connected power semiconductors are connected to corresponding midpoint nodes in adjacent H-bridges to produce a single output phase at the required voltage. By such series connection of a plurality of H-bridges, any desired output voltage can be produced based on load requirements and the output voltage is not constrained by semiconductor device ratings.

To achieve a very high effective switching frequency, the power semiconductor switches are operated using a two-dimensional interleaved pulse width modulation algorithm or a random switching algorithm, which produces a switching waveform frequency at the static power converter terminals which can be more than an order of magnitude higher than the switching frequency of a single switch. In a particular embodiment, the carrier waveforms for switching a particular H-bridge are a triangle wave and its complement. These waveforms are compared to an output reference waveform to generate gate signals for the switches so that, when the upper left and lower right switches are on, the output voltage is a positive voltage equal to the applied DC voltage, and when the lower left and upper right switches are on, the output voltage is the negative of that voltage. If both upper switches or both lower switches are on, the output voltage of the H-bridge is zero and current flows through the bridge without taking power from the applied DC voltage source.

In order to interleave the levels within a multi-level phase driver using the two-dimensional interleave algorithms, the triangle carrier waveforms are each phase-shifted with respect to each other by an angle which is equal to 360°/2l, where l is the number of levels comprising a multi-level phase driver. In addition, normal and complementary triangle carrier waveforms are established for the H-bridge levels of the multiple static power converter circuits so that the carrier waveform for each circuit at the level of interest is phase-shifted with respect to the corresponding circuits of the same level by an angle which is equal to the phase shift between levels divided by the number of static power converter circuits. With this arrangement a very high effective switching frequency is provided, equal to twice the pulse width modulated frequency of a single switch times the number of levels times the number of circuits. This allows operation of the power semiconductor switches in their most efficient operating mode while achieving a high effective switching frequency.

A random switching algorithm can be implemented using a triangular PWM carrier waveform with a period randomly varied between a minimum and maximum frequency. The minimum and maximum frequency chosen depend on the switching device selected and the performance desired such as efficiency or power quality. Other random switching algorithms can be employed.

In the multi-level static power converter of the invention, the total load is naturally partitioned in three dimensions. The first dimension, as is the case with all polyphase static power converters, is the number of phases. Each static power converter phase provides 1/p of the total power (where p is the total number of phases). The second dimension is the number of circuits that make up each phase. Each circuit of any phase provides (1/p)/k of the total power where k is the number of circuits per phase. The final dimension is the number of levels that make up an individual circuit of any phase. Each level of a given circuit of a given phase provides ((1/p)/k)/l of the total power where l is the number of levels that make up each circuit. This increment of power is the H-bridge power module rating.

It is possible to tailor the power available from the static power converter of the invention to the power required by the load by adjusting the number of power modules that contribute to the overall power provided by the converter. The first load partitioning method involves shutting down half of the static power converter circuits to effectively reduce the overall static power converter losses at light loads. In another load partitioning method, individual static power converter circuits can be shut down to more closely tailor the power provided by the static power converter to match that required by the load.

The multi-level phase driver of the invention enables modes of operation in which entire modules can be configured to produce no output voltage, yet provide a path for current flow through the module. This configuration is referred to as a "pass through", and can be exploited to further reduce static power converter losses at part power by configuring one or more levels in each phase as a "pass through", thereby reducing the switching losses associated with the power semiconductors.

With the static power converter of the invention the power rating can be tailored by shutting down either circuits or levels. Another load partitioning arrangement presented involves partitioning the power rating by shutting down phase groups, leaving a symmetrically balanced set of phases supplying power to the load. In a six phase motor and static power converter, for example, three phases may be shut down to reduce the number of static power converter modules required to support the required load.

BRIEF DESCRIPTION OF THE DRAWINGS

Further objects and advantages of the invention will be apparent from a reading of the following description in conjunction with the accompanying drawings, in which.

DESCRIPTION OF THE PREFERRED EMBODIMENTS

Figure 1A:
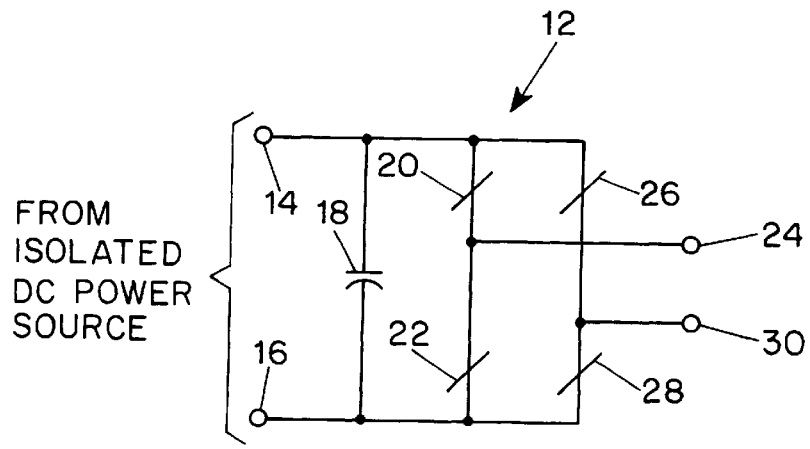
FIG. 1a is a schematic circuit diagram illustrating an H-bridge used in a multi-level phase driver according to the invention.
Figure 5:
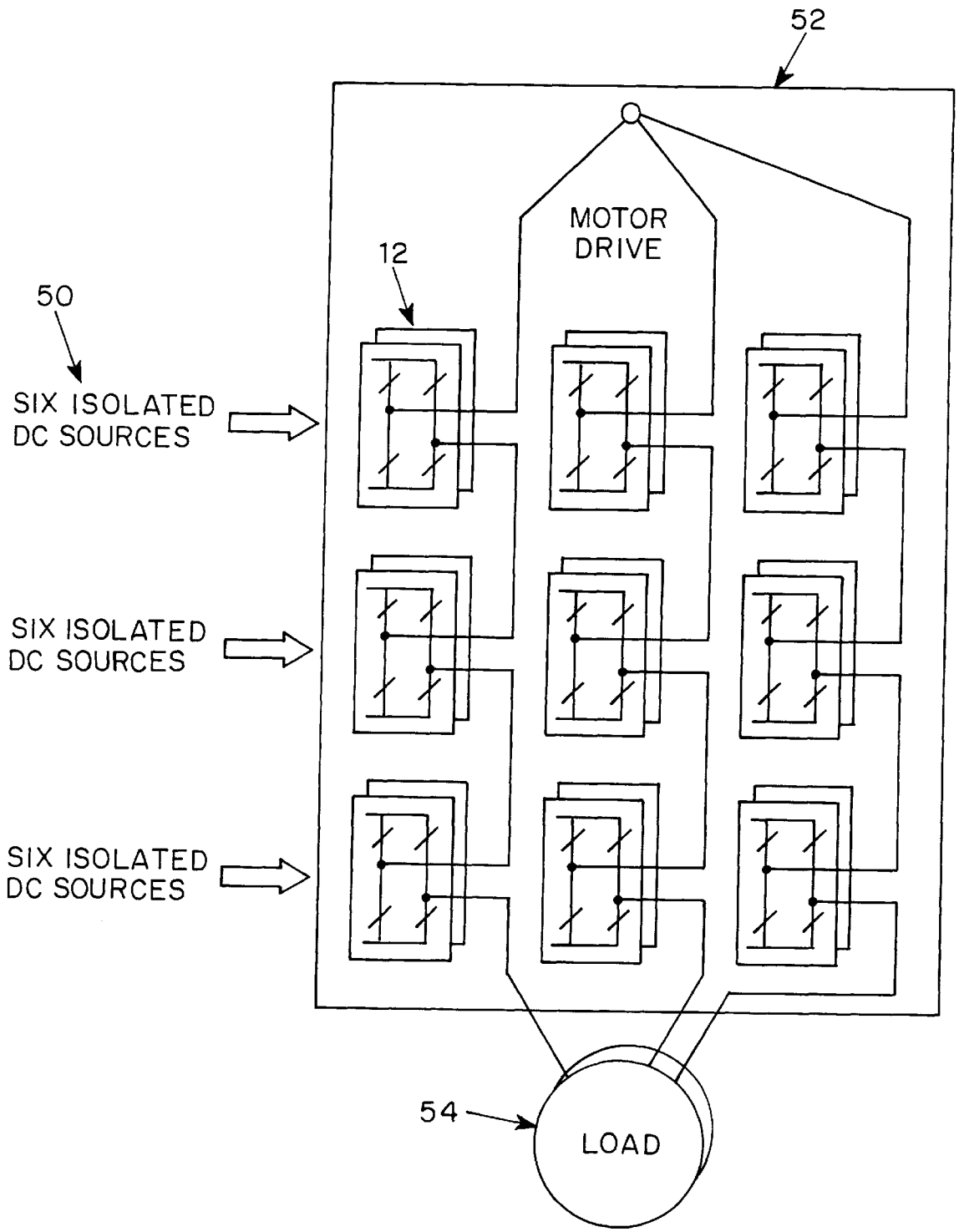
FIG. 5 is a schematic block diagram illustrating the arrangement of a power converter system for an electric load utilizing a static power converter arrangement in accordance with an embodiment of the invention.

In the representative power converter system for an electric load shown in FIG. 5, six isolated DC power sources 50 supply an array of power semiconductor switches 52 arranged in H-bridges 12 which are connected in series or "levels" as shown to produce the line-to-neutral voltage required for a particular output phase to a load 54. In the representative embodiment, a typical H-bridge 12, shown in FIG. 1a, receives power from an isolated DC power source through two terminals 14 and 16 shunted by a capacitor 18 and has two power transistors 20 and 22 connected between the lines 14 and 16, with the midpoint connected to an output terminal 24 and two further power transistors 26 and 28 connected between the lines 14 and 16 with the midpoint connected to another output terminal 30.

Figure 1B:
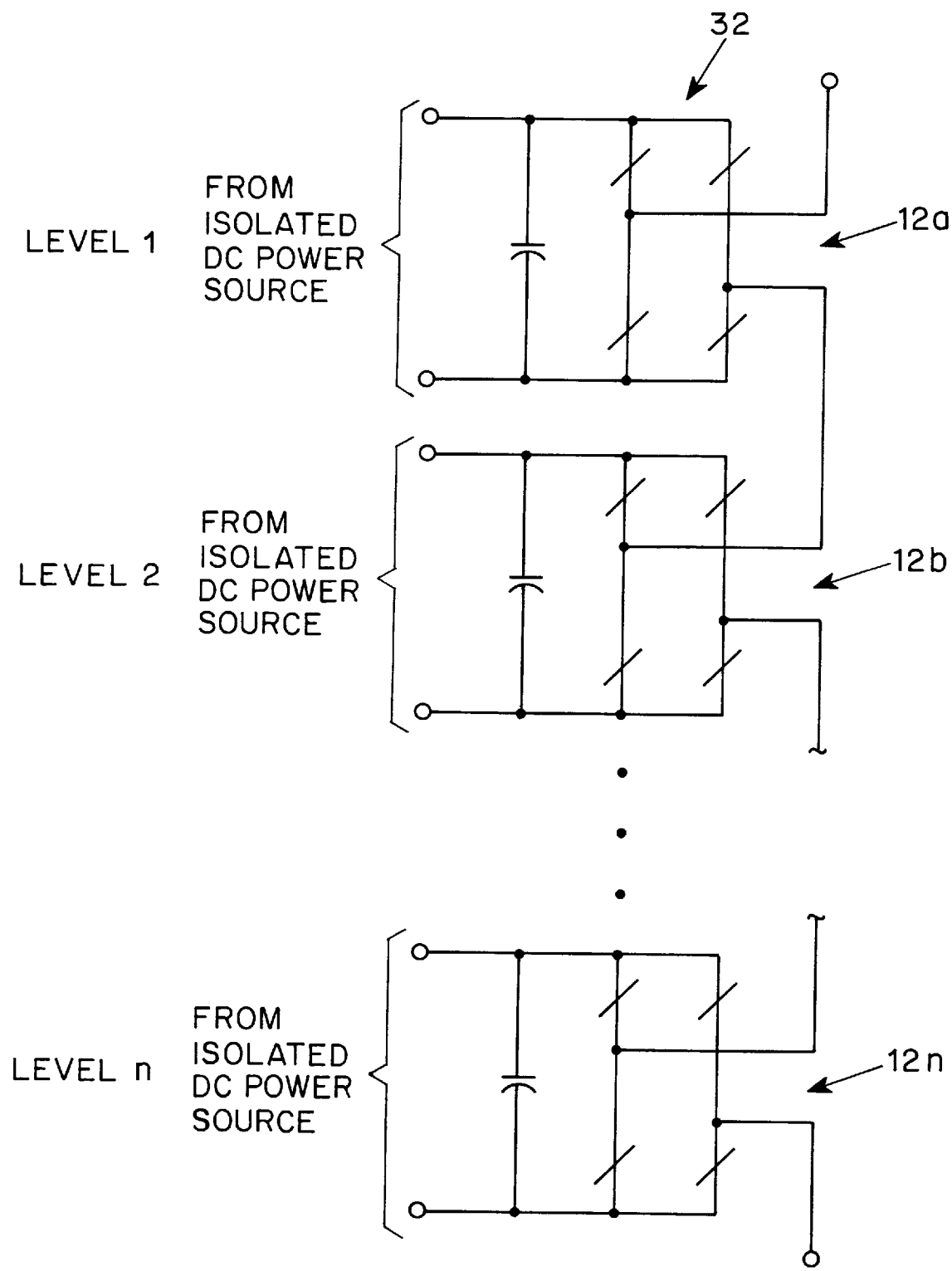
FIG. 1b is a schematic diagram illustrating a representative embodiment of a multi-level phase driver for use in the invention.

As shown in FIG. 1b, a series of H-bridges 12a, 12b through 12n, with output terminals connected in series to adjacent H-bridges, comprises a multi-level phase driver 32 having a peak output voltage equal to the total of the isolated DC power source voltages.

Figure 2:
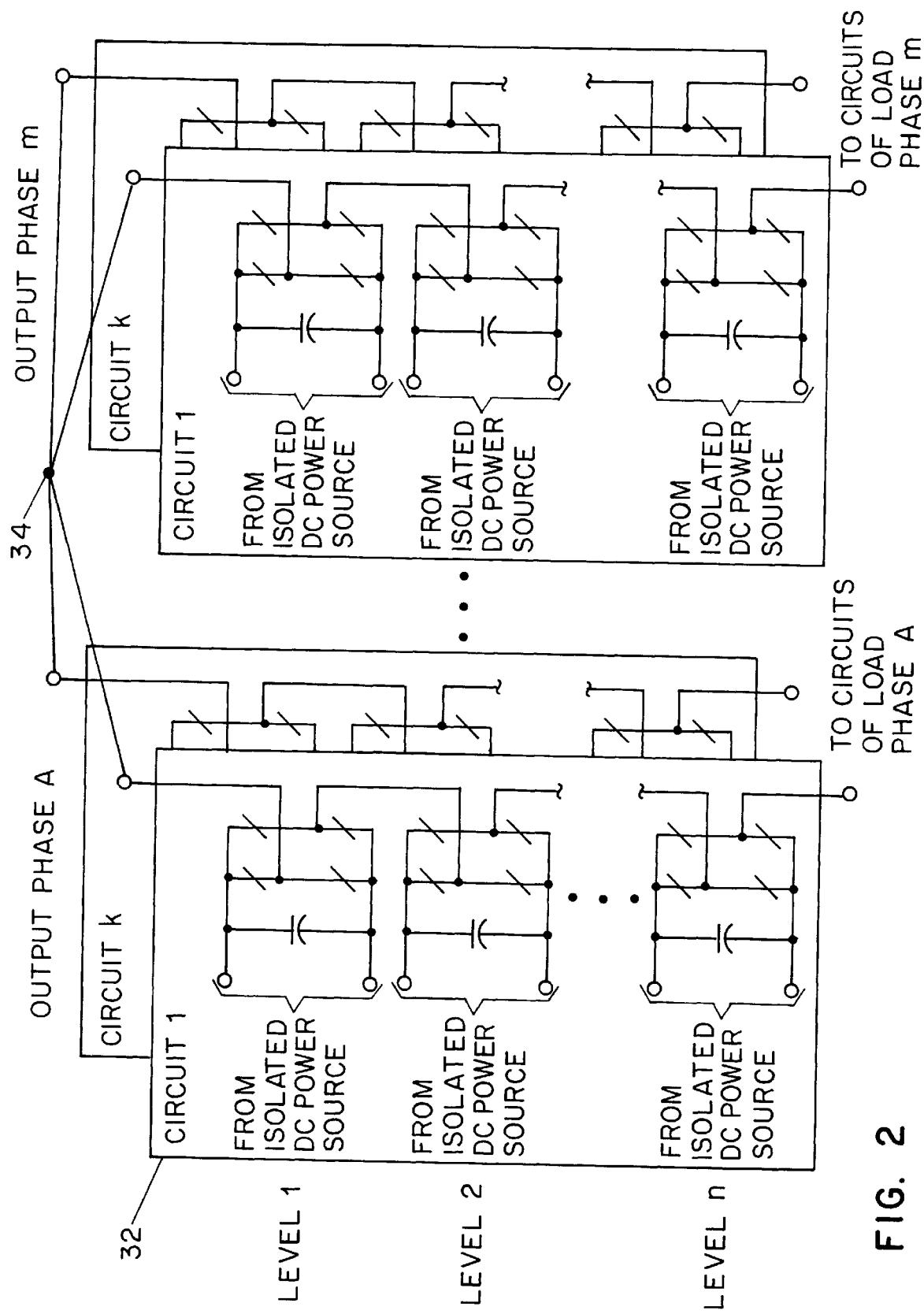
FIG. 2 is a schematic block diagram illustrating a multi-level, multi-phase, multi-circuit static power converter arrangement according to the invention.

FIG. 2 illustrates the arrangement of a plurality of multi-level phase drivers 32 arranged to supply power to several phases of a multi-phase, multi-circuit load. In the illustrated arrangement, all of the multi-level phase drivers 32 are connected at one end to a neutral point 34 and supply power to the several phases A . . . m of the load from the other ends of the multi-level phase drivers.

Figure 3:
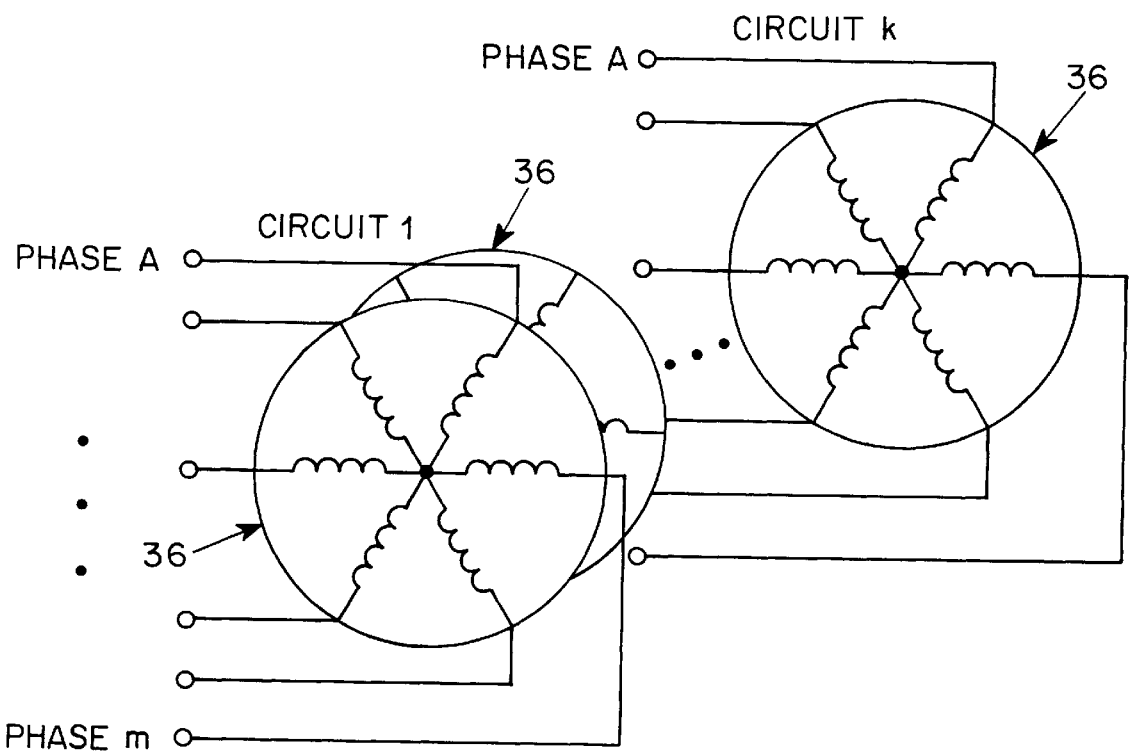
FIG. 3 is a schematic circuit diagram illustrating an electrical arrangement of a multi-phase, multi-circuit motor.

FIG. 3 is a schematic circuit diagram showing the arrangement of the circuits in a representative motor load supplied with power from the static power converter illustrated in FIG. 2. As shown in FIG. 3, the motor includes a total of k circuits 36, each circuit 36 being supplied with m phases of power from the static power converter.

In order to achieve a very high effective switching frequency, i.e., a high frequency of the flux component in the representative motor load that is the result of the ripple current generated by the static power converter output voltage waveform, a two-dimensional interleaved pulse width modulation (PWM) algorithm is used to allow operation of the power semiconductor switches in their most efficient operating mode while producing a switching waveform at the static power converter terminals that can be more than an order of magnitude higher than the PWM frequency of a single switch. Either of two algorithms may be used to produce this two-dimensional interleave as described hereinafter.

The effective switching frequency produced by the static power converter is a function of the PWM frequency of an individual switch, the number of H-bridge levels in the multi-level phase driver, and the number of multi-level phase driver circuits per phase according to the relationship $f_{eff} = 2lkf_{pwm}$, where:

$F_{eff}$ is the effective switching frequency seen by the load;
$f_{pwm}$ is the carrier waveform frequency;
l is the number of series levels; and
k is the number of static power converter circuits.

The PWM algorithm used to produce the switching pattern is a modification of the basic triangular PWM algorithm in which a carrier waveform is compared to a reference waveform that represents the desired output waveform. Other PWM algorithms can also be employed effectively.

Figure 6:
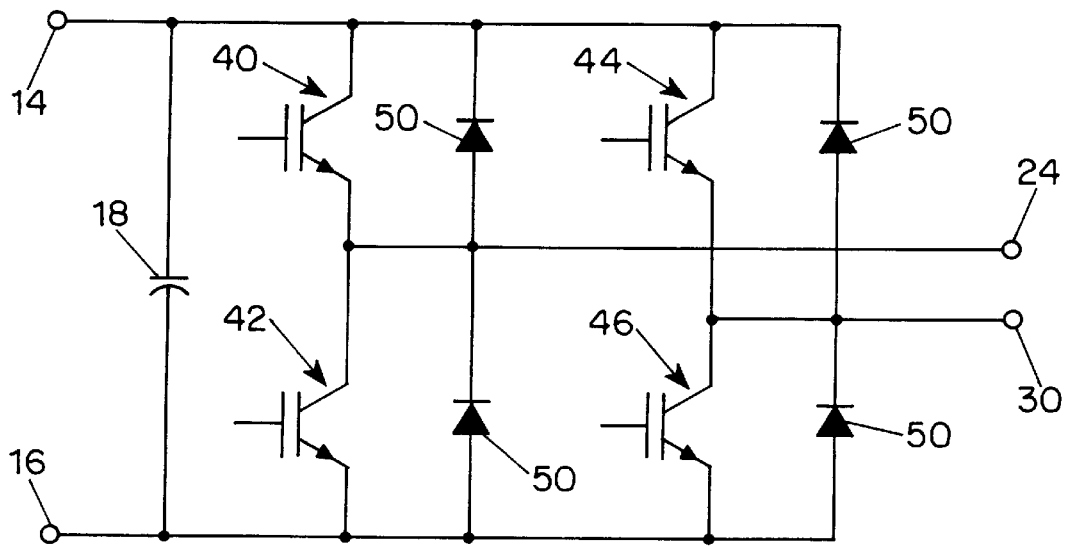
FIG. 6 is a schematic circuit diagram illustrating an arrangement of the H-bridge of FIG. 1a using power transistors such as IGBT semiconductor devices.

In a preferred embodiment of the invention, the carrier waveforms for an individual H-bridge are a triangle wave and its complement. In the typical H-bridge shown in FIG. 6, the states of a left pair of switches 40 and 42 are controlled by comparison of the normal triangle wave with the reference and the states of a right pair of switches 44 and 46 are controlled by comparison of the complementary triangle wave with the reference. Each of the switches is shunted by a diode 50.

When the upper left and lower right switches 40 and 46 are on, the output voltage of the bridge is $+V_{rail}$ which is the voltage applied across the terminals 14 and 16 of the bridge. When the lower left and upper right switches 42 and 44 are on, the output voltage of the bridge is $-V_{rail}$. When either both upper switches or both lower switches are on, the output voltage of the bridge is zero and current flows through one of the two switches and the diode 50 shunting the other switch depending on the polarity of the output terminals.

Interleaving of the levels within a multi-level phase driver is achieved according to either of the following algorithms:

Interleave Algorithm 1:

Normal and complementary triangle waveforms of the desired switching frequency are established for each H-bridge level of a multi-level phase driver. The triangle carrier waveforms of each level are phase shifted with respect to each other by an angle $\alpha_{lvl}=360°/l$, where l is the number of phase levels of a multi-level phase driver.

Figure 4:
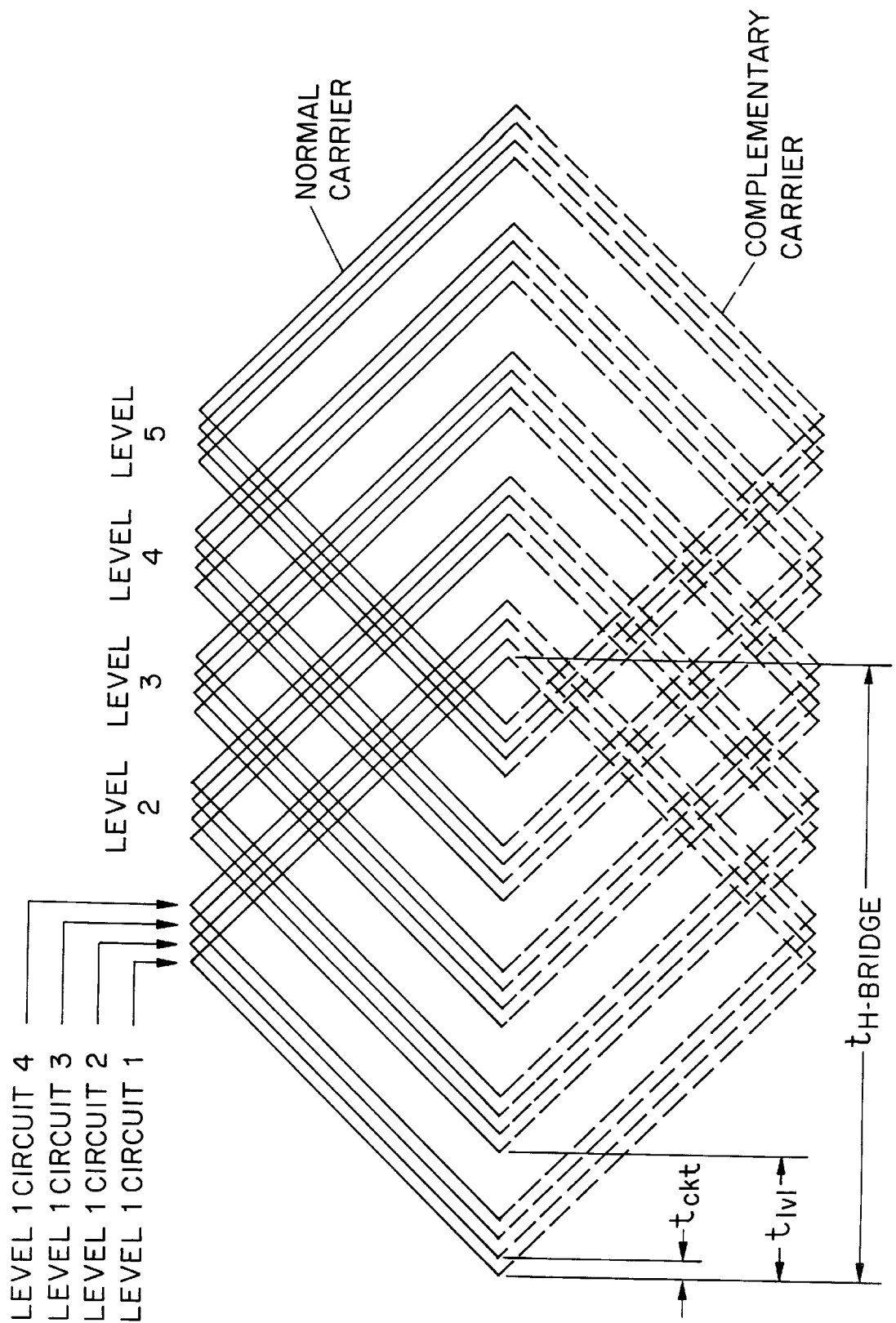
FIG. 4 is a graphical representation showing the carrier waveforms required for a five level, four circuit static power converter.

In addition, normal and complementary triangle carrier waveforms of the desired switching frequency are established for the multi-level phase drivers of the multiple circuits such that the carrier waveforms of each circuit of the level of interest are phase-shifted with respect to the corresponding circuits of the same level by the angle $\alpha_{ckt}=\alpha_{lvl}/2k$ where k is the number of static power converter circuits. The required carrier waveforms for a five level, four circuit static power converter are illustrated in FIG. 4.

Interleave Algorithm 2:

The second two-dimensional interleave algorithm is similar to the first where normal and complementary triangle carrier waveforms of the desired switching frequency are established for each H-bridge level of a multi-level phase driver. In this case, however, the triangle carrier waveforms of each level are phase-shifted with respect to each other by an angle $\alpha_{lvl}=360°/2l$ where l is the number of levels of a multi-level phase driver. In addition, normal and complementary triangle carrier waveforms of the desired switching frequency are established for the multi-level phase drivers of the multiple circuits, such that the carrier waveforms of each circuit of the level of interest are phase-shifted with respect to the corresponding circuits of the same level by the angle $\alpha_{ckt}=\alpha_{lvl}/k$ where k is the number of static power converter circuits.

The time shifts between the PWM carrier waveforms for either of the above interleave algorithms are calculated as follows:

$\tau_{PWM}=(1/f_{PWM})$;

$\tau_{lvl}=\alpha_{lvl}/(2\pi/\tau_{PWM})$; and $\tau_{ckt}=\alpha_{ckt}/(2\pi/\tau_{PWM})$.

Random Switching Algorithm:

A third switching technique is one in which a randomized switching algorithm is employed. Utilizing a random switching algorithm spreads the current harmonics present in the output waveform over a range of spectra. The range in which the switching harmonics are dispersed begins at the lowest random carrier frequency and continues throughout the random frequency range and also includes the multiples of these random frequencies. Consequently, the output current harmonic spectrum appears as broadband noise in addition to the fundamental reference waveform harmonic. The ratio of fundamental to switching harmonics (i.e. the signal to noise ratio) is large and requires little or no output filtering. Also, no specific tones are generated in the load from a static power converter with a random switching algorithm.

For the multi-level power converters according to the invention, application of a random switching algorithm eliminates the need for interleaving of carrier waveforms, thereby simplifying the control system architecture. By implementing a random switching algorithm into a multi-level power converter, the switching harmonics present in the output are dispersed, and the signal to noise ratio is improved.

Random switching can be implemented using a triangular carrier waveform with a period randomly varied between a minimum and maximum frequency. The minimum and maximum frequency chosen depend on the switching device selected, and the performance desired, such as efficiency or power quality. For a multi-level static power converter of the invention, the right pole pair of switches is controlled by comparison of the random period triangle waveform with the reference waveform. When the reference is greater than the carrier, the upper switch is on (lower switch off); and when the reference is less than the carrier, the lower switch is on (upper switch off). The left pole pair of switches is controlled by comparison of the inverse of the random triangle with the reference waveform. When the reference is less than the carrier, the upper switch is on (lower switch off); and when the reference is greater than the carrier, the lower switch is on (upper switch off). Alternatively, a random rise time and a random fall time for the triangular PWM carrier waveform could be implemented for the same multi-level full bridge topology.

Another random switching algorithm, pulse density modulation, is achieved when a voltage pulse with a fixed width (i.e. fixed time period) is used as the carrier from which the output voltage is created. In this case, an integral number of pulses are used to synthesize the output waveform, and the modulator determines the shape of the pulse train.

The spectrum of the resulting voltage waveform has a characteristic broadband "colored noise" appearance, similar to the random PWM switching algorithm, which can be taken advantage of in a multi-level power converter. Specifically, the non-coherent broadband spectrum sums according to the power sum relationship $$V_{h_r} = \sqrt{\sum_{i=1}^{n} V_{h_i}^2}$$

where $V_{h_r}$ is the resultant spectrum, $V_{h_i}$ is the spectrum produced by one power converter level, and n is the number of power converter levels. The demodulated fundamental is coherent and sums directly according to the relationship $$V_{f_r} = \sqrt{\sum_{i=1}^{n} V_{f_i}}$$

where $V_{f_r}$ is the resultant fundamental voltage, $V_{f_i}$ is the fundamental voltage produced by one power converter level, and n is the number of power converter levels. Therefore, when compared with the signal to noise ratio of a single level, the resultant signal to noise ratio improves with increasing levels according to the relationship:

$$\frac{S_r}{N_r} = \frac{V_{f_r}}{V_{h_r}} = \frac{nV_{f_1}}{\sqrt{nV_{h_1}^2}} = \frac{n}{\sqrt{n}} \frac{V_{f_1}}{V_{h_1}} = \frac{n}{\sqrt{n}} \frac{S_1}{N_1}$$

The static power converter arrangement of the invention achieves very high full and part power efficiencies using the implementation of a unique load partitioning method. The capacity of the static power converter system is partitioned by design according to the number of static power converter circuits implemented so that each multi-phase circuit provides the factor 1/k of the total power, k being the number of circuits. By turning off selected carrier waveforms, entire multi-level, multi-phase circuits can be shut down, thereby reducing overall static power converter losses. To ensure that output spectral performance is not adversely affected as static power converter circuits are shut down, symmetry of carrier waveforms must be maintained among the multi-phase circuits that remain. This may be accomplished by using one of several selected load partitioning methods.

Load Partitioning Method 1:

In a first method for partitioning load the static power converter circuits can be shut down one by one so that the static power converter rating can be partitioned in increments of 1/k. This allows the static power converter capacity to be closely tailored to the power required by the load. This is accomplished by shutting down the carrier waveforms of the circuit of interest and then redistributing the remaining carrier waveforms according to the two dimensional interleave method described above, which requires recalculation and redistribution of the remaining carrier waveforms.

Load Partitioning Method 2:

In a second load partitioning method, interleaved circuit carrier waveforms are selected for shut-down so that the phase shifts between the remaining carrier waveforms are evenly distributed in time so that no modification is necessary for the remaining carrier waveforms. In one example, a four circuit static power converter having carrier waveforms such as shown in FIG. 4 is used. In this case, the even numbered circuits can be shut down, reducing the static power converter capacity by 50% and eliminating all losses related to the shut down circuits while leaving the remaining circuits symmetrically distributed. In addition, one of the two remaining carriers can also be shut down, reducing the static power converter capacity to 25%. This method is simpler than Load Partitioning Method 1 but its flexibility is limited by the number of circuit combinations that ensure symmetry is maintained.

Load Partitioning Method 3:

A third load partitioning method allows the static power converter levels to be shut down one by one so that the static power converter voltage rating can be partitioned in increments of 1/l. This allows the static power converter capacity to be closely tailored to the power required by the load by adjustment of the output voltage to each multi-phase circuit, and is accomplished by turning either both upper switches or both lower switches on in a given level, thus generating zero voltage at that level but allowing a path for current flow to the adjacent levels. This method requires recalculation and redistribution of the remaining carrier waveforms, unless the demand is such that levels can be turned off in a symmetrical fashion.

Load Partitioning Method 4:

A fourth load partitioning method allows the static power converter phases to be shut down in such a way as to allow balanced phase separations of the remaining multi-level phase drivers within each circuit. For example, in a six-phase multi-level, multi-circuit static power converter, three of the multi-level phase drivers may be shut down, leaving balanced three-phase power supplied to the multi-phase, multi-circuit load.

Load Partitioning Method 5:

A fifth load partitioning method allows partitioning of load using a combination of load partitioning methods one through four. Selected H-bridges are shut off in a combination of levels, circuits and phases. This method allows the most flexibility in tailoring the static power converter capacity to the power required by the load, and requires the highest level of control complexity of all of the load partitioning methods.

Figure 8:
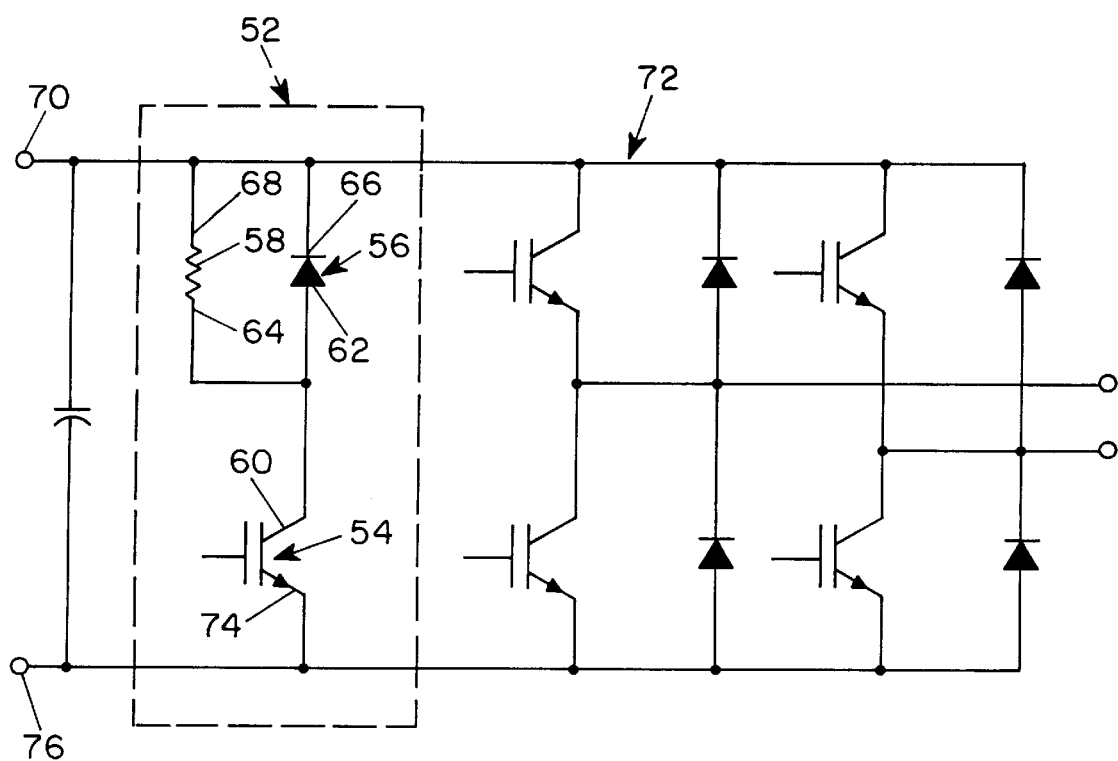
FIG. 8 is a schematic circuit diagram illustrating an arrangement of a dynamic braking system for use within the H-bridge of FIG. 6.
Figure 9:
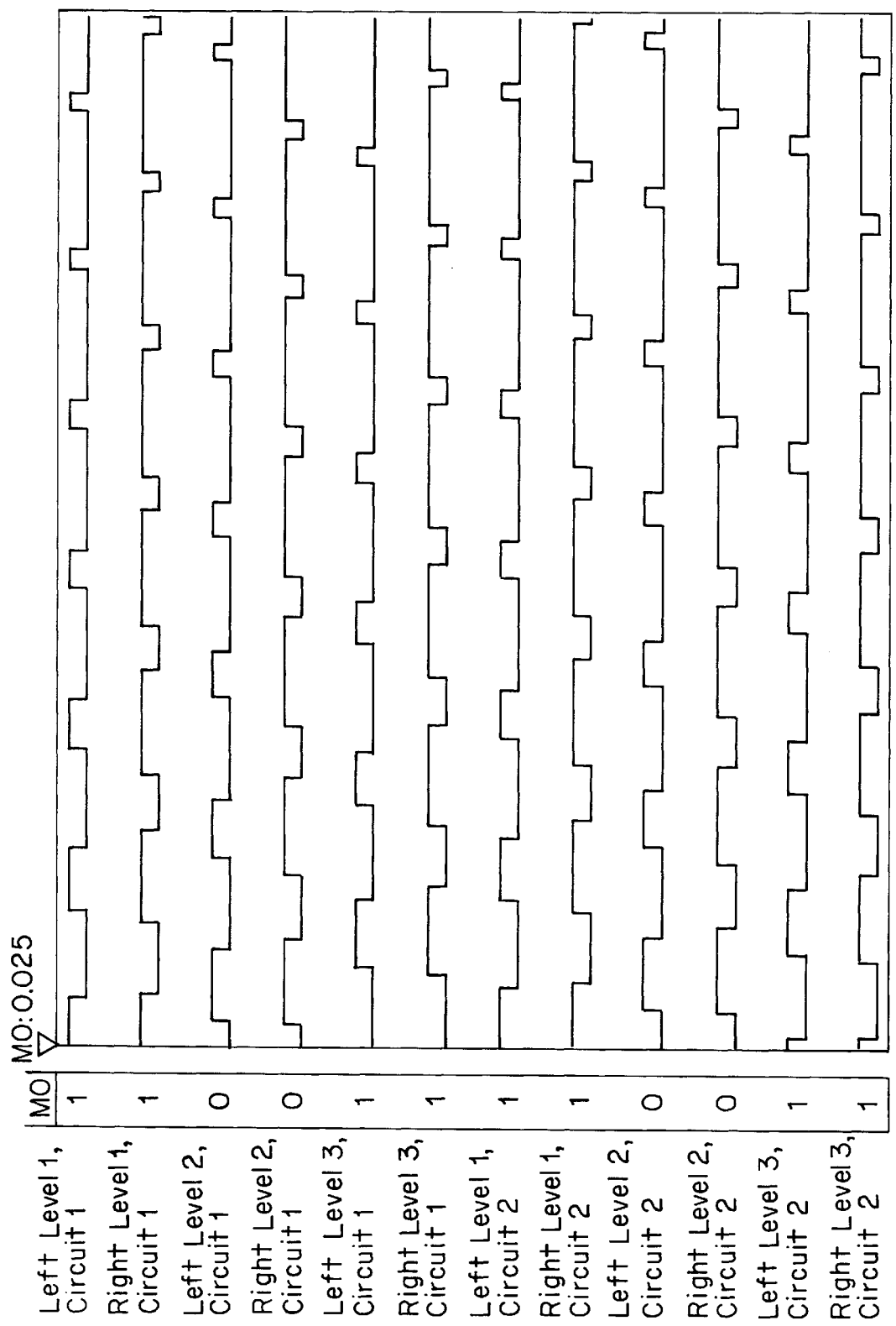
FIG. 9 is a graphical illustration showing left and right gate drive signals for H-bridges used in the invention.
Figure 10:
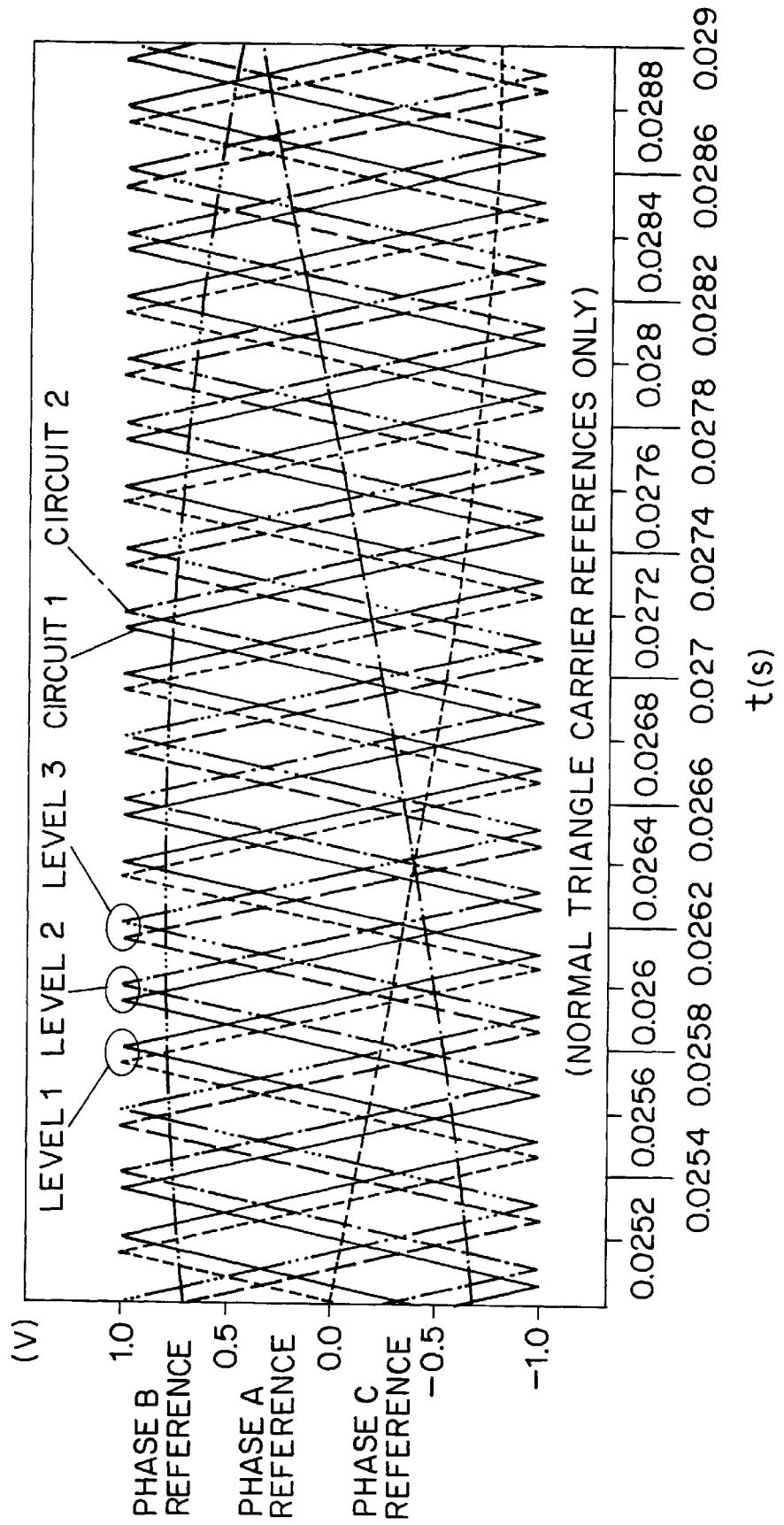
FIG. 10 is a graphical illustration showing representative three-phase reference waveforms and triangle modulation waveforms used in the invention.
Figure 11:
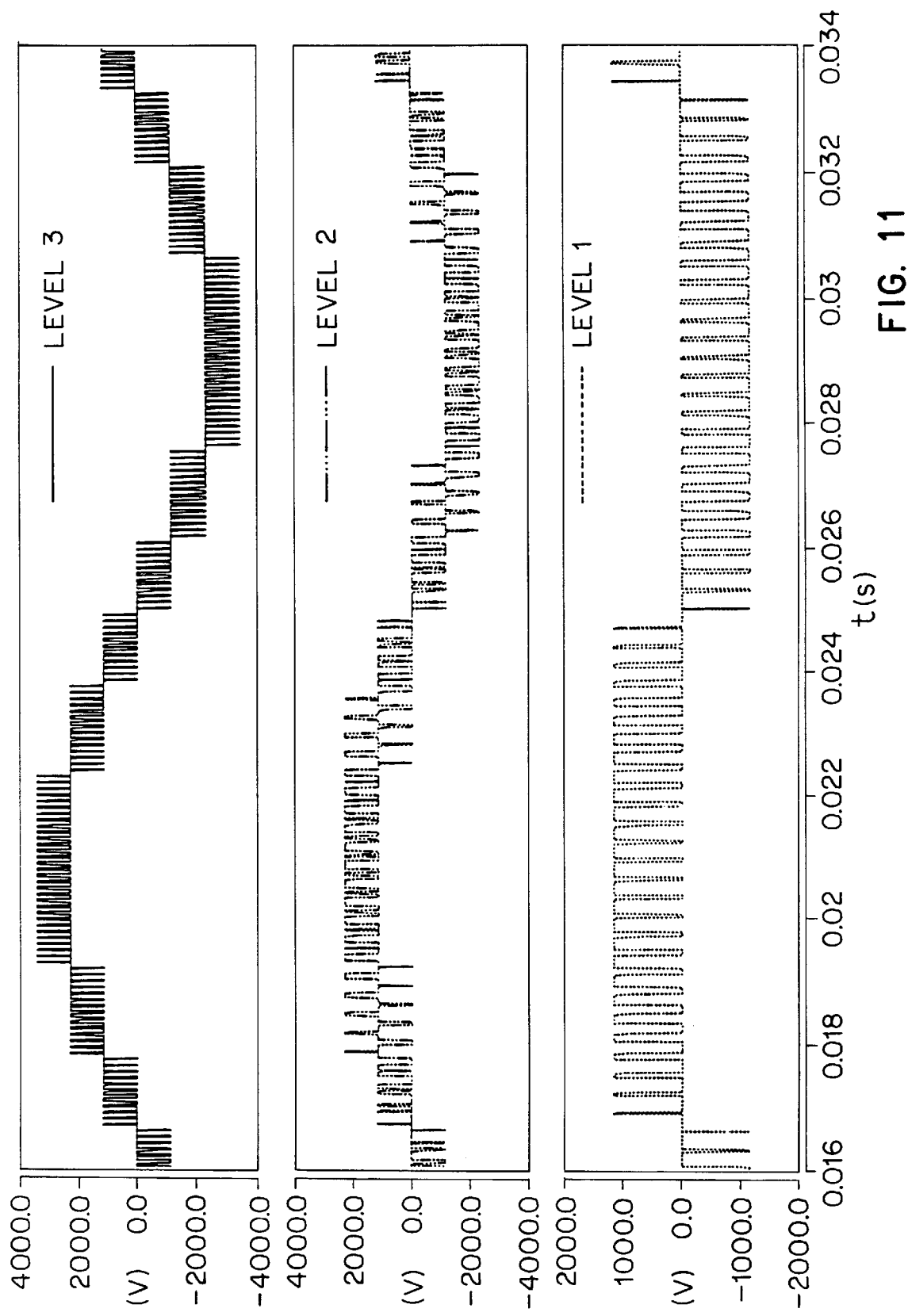
FIG. 11 is a graphical representation showing voltages for individual levels of a representative three level phase driver, for one phase in one of the circuits of the static power converter of the invention.
Figure 12:
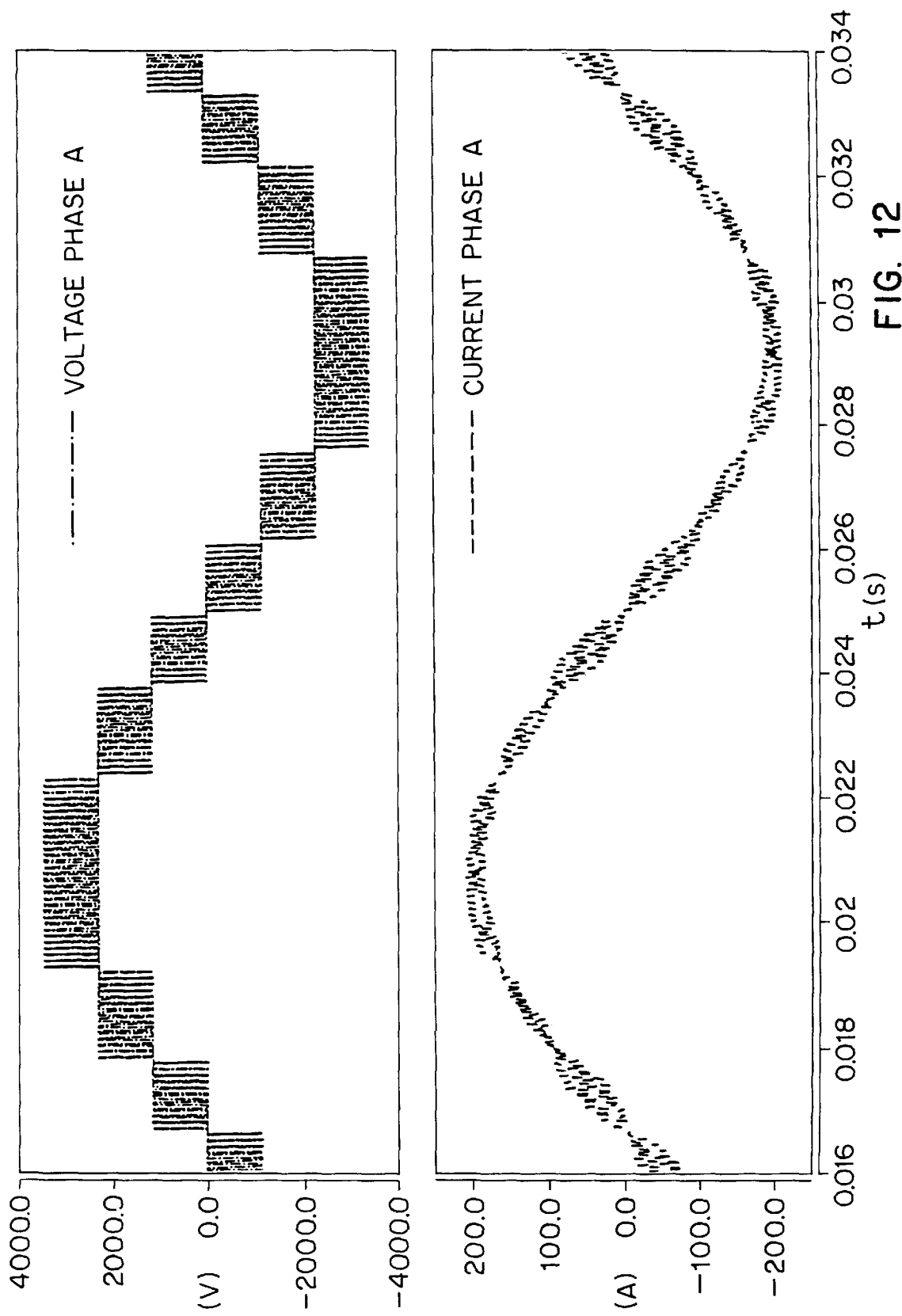
FIG. 12 is a graphical illustration showing the multi-level phase driver output voltage and load current for one circuit of one phase in the static power converter.
Figure 13:
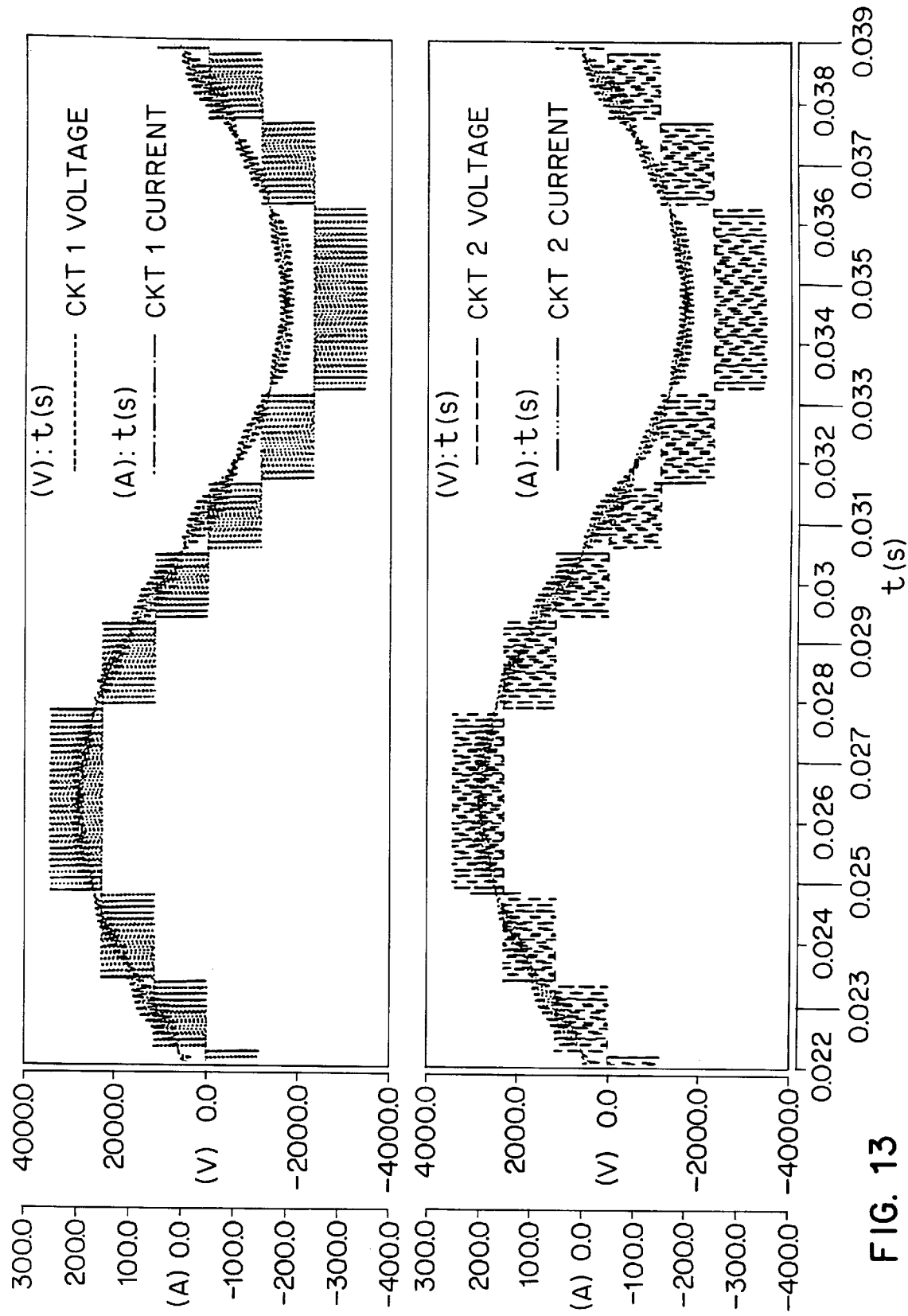
FIG. 13 is a graph showing the output voltages and currents for two circuits in one of the phases of the static power converter.
Figure 14:
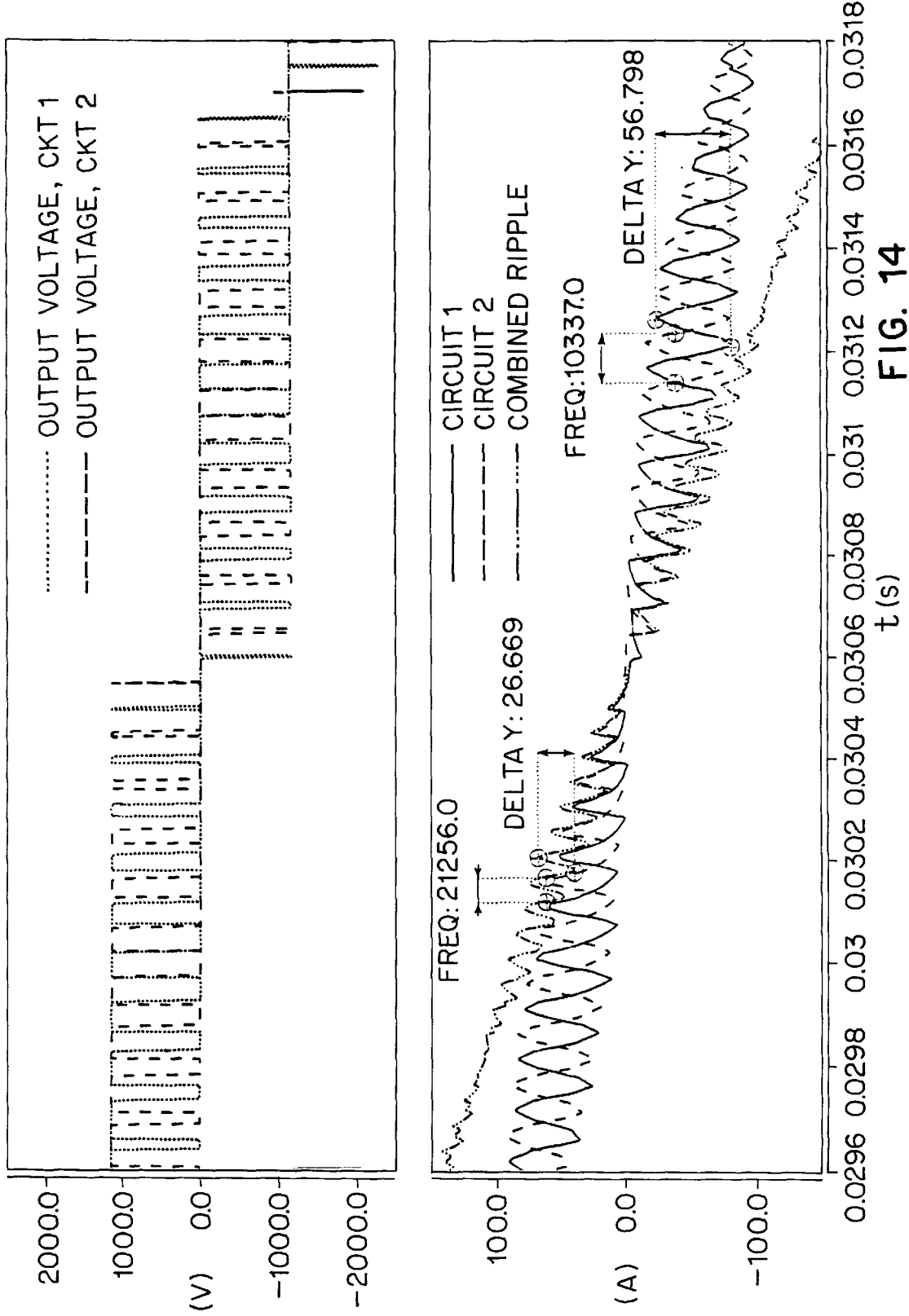
FIG. 14 is a graphical illustration showing output voltages and ripple currents for two of the circuits in one of the phases in the static power converter, as well as the combined result of the individual ripple currents.
Figure 15:
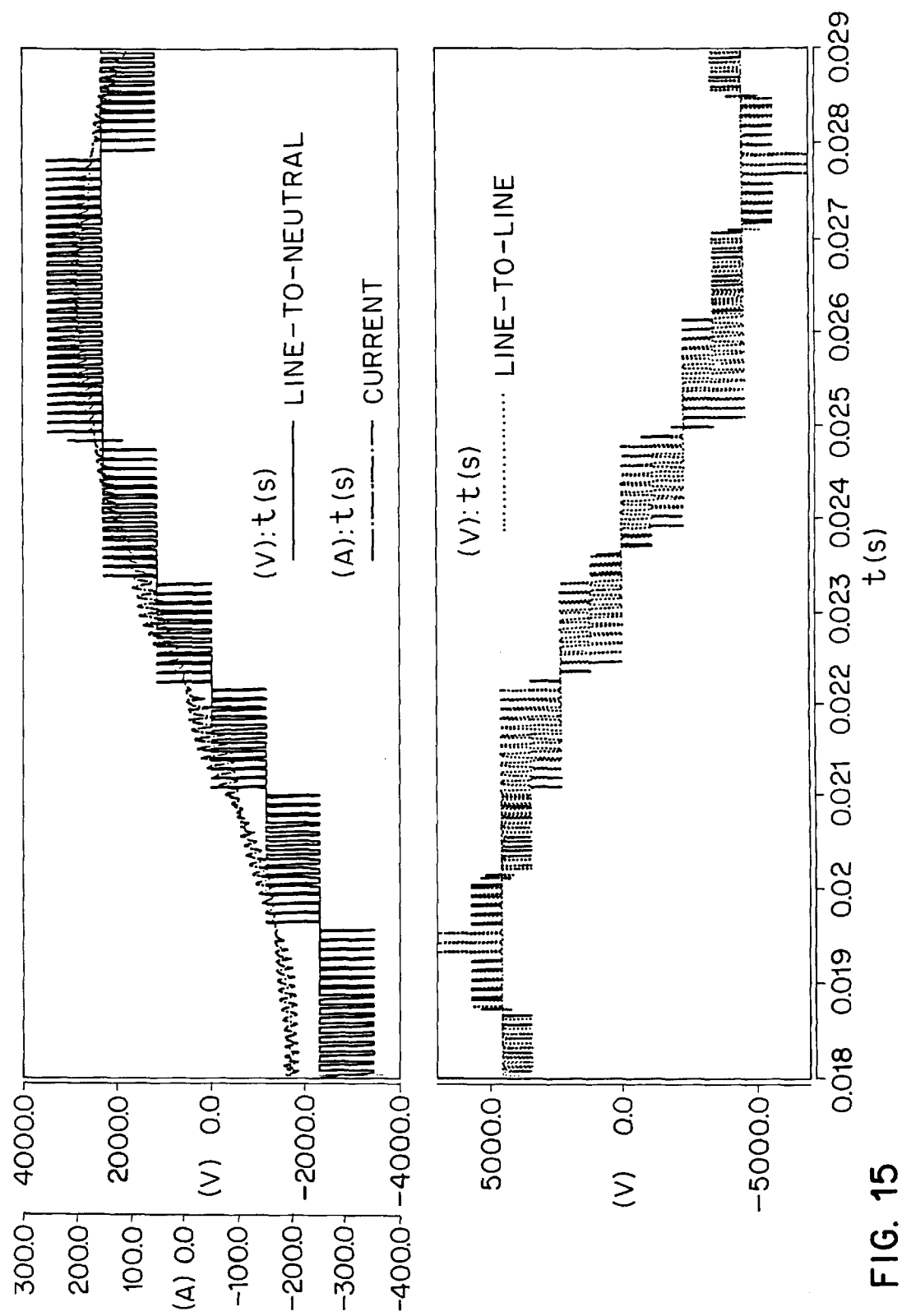
FIG. 15 is a graphical illustration showing line-to-neutral and line-to-line voltages in the representative motor load of FIG. 3.
Figure 16:
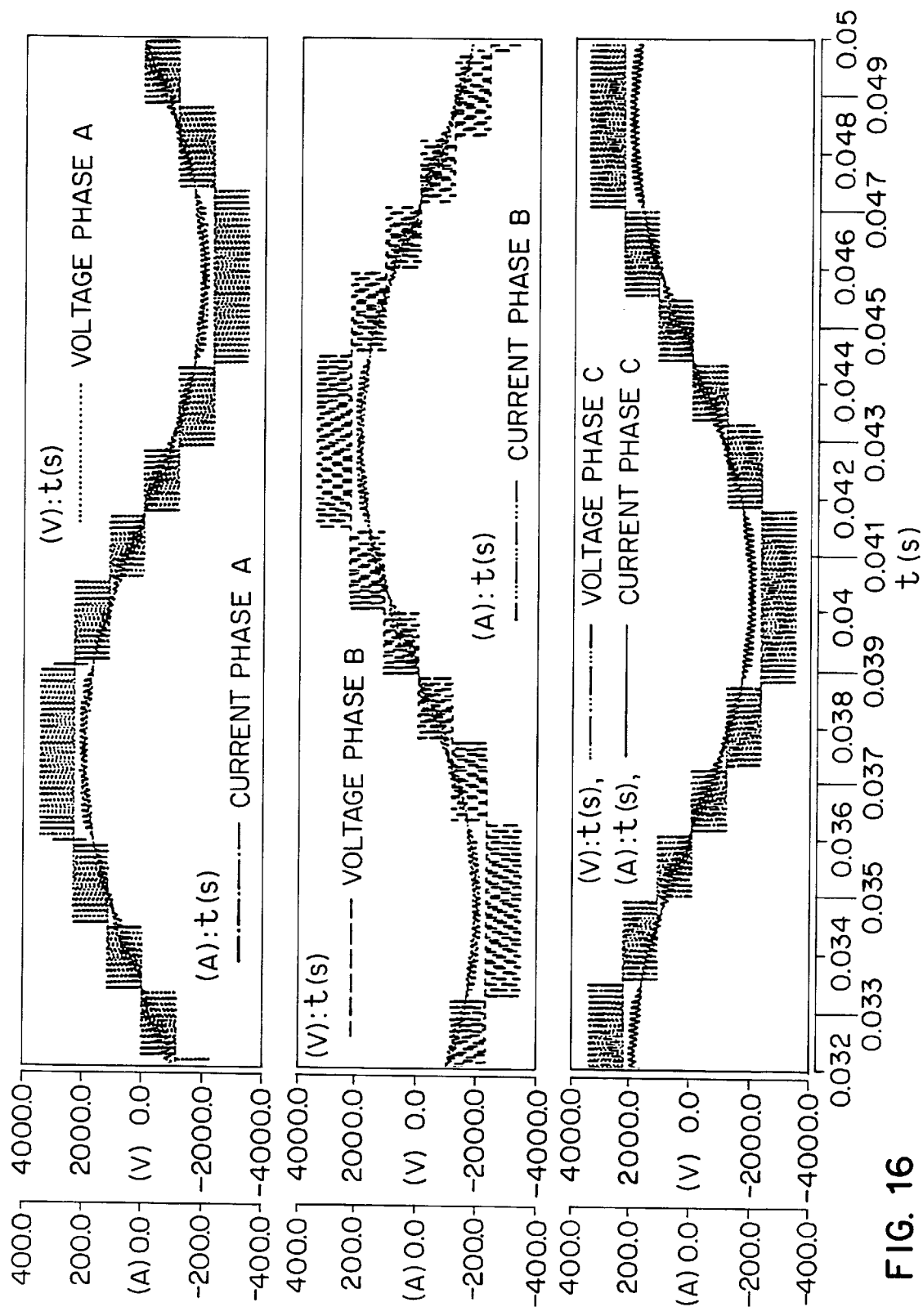
FIG. 16 is a graphical illustration showing static power converter line-to-neutral voltages and load currents for one of the representative three-phase circuits in accordance with the invention.

A modular dynamic braking system for controlling motor loads can be incorporated into the static power converter embodiments described herein. As shown in FIG. 8, a modular dynamic braking system 52 includes a power semiconductor 54, a freewheeling diode 56, and a braking resistor 58 arranged so that the collector 60 of the power semiconductor is connected to the anode 62 of the diode 56 and to a terminal 64 of the braking resistor 58. The cathode terminal 66 of the diode 56 and the other terminal 68 of the braking resistor 58 are connected to a positive DC input terminal 70 of an H-bridge 72 while the emitter 74 of the power semiconductor is connected to the negative terminal 76 of the H-bridge. Each H-bridge in the static power converter is provided with an identical braking assembly connected across its DC input terminals and each of the braking resistors is sized to dissipate a fraction of the motor regenerated energy, permitting the static power converter to dissipate the total motor regenerated energy. The power semiconductors 54 used to switch the braking resistors 58 into the circuit can be individually controlled by monitoring the DC voltage across each respective H-bridge. If the DC voltage exceeds a pre-determined setpoint, the power semiconductor is turned on, thereby introducing the braking resistor into the circuit to dissipate energy until the DC voltage falls to its nominal level.

In the typical example of a preferred embodiment shown in FIG. 5, eighteen isolated DC sources 50 supply voltage to a three-phase, three-level, two-circuit static power converter 52 which, in turn, supplies power to a medium voltage three phase, two-circuit permanent magnet synchronous motor 54. In this representative example, the eighteen isolated DC voltage sources 50 supply approximately 1,150 volts each.

In accordance with the invention, a static power converter is assembled from a collection of H-bridge of power modules 12, PWM sequencers and externally produced three-phase reference signals. As described above and shown in FIG. 6 each power module includes a pair of isolated DC source conductors 14 and 16, a DC link capacitor bank 18, an H-bridge consisting of four switches 40, 42, 44 and 46 shunted by diodes 50 and a pair of output conductors 24 and 30. The gating signals that drive the H-bridge switches 40, 42, 44 and 46 are generated in a PWM sequencer 80 shown in FIG. 7. Each PWM sequencer 80 receives an externally produced reference waveform, such as a sinusoid, and compares this reference to triangle waveforms generated within the PWM sequencer according to the two-dimensional interleaving scheme described above and shown in FIG. 4. The PWM frequency is pre-determined along with the necessary phase shifts between triangle waveforms, as calculated according to the procedure described above.

Figure 7:
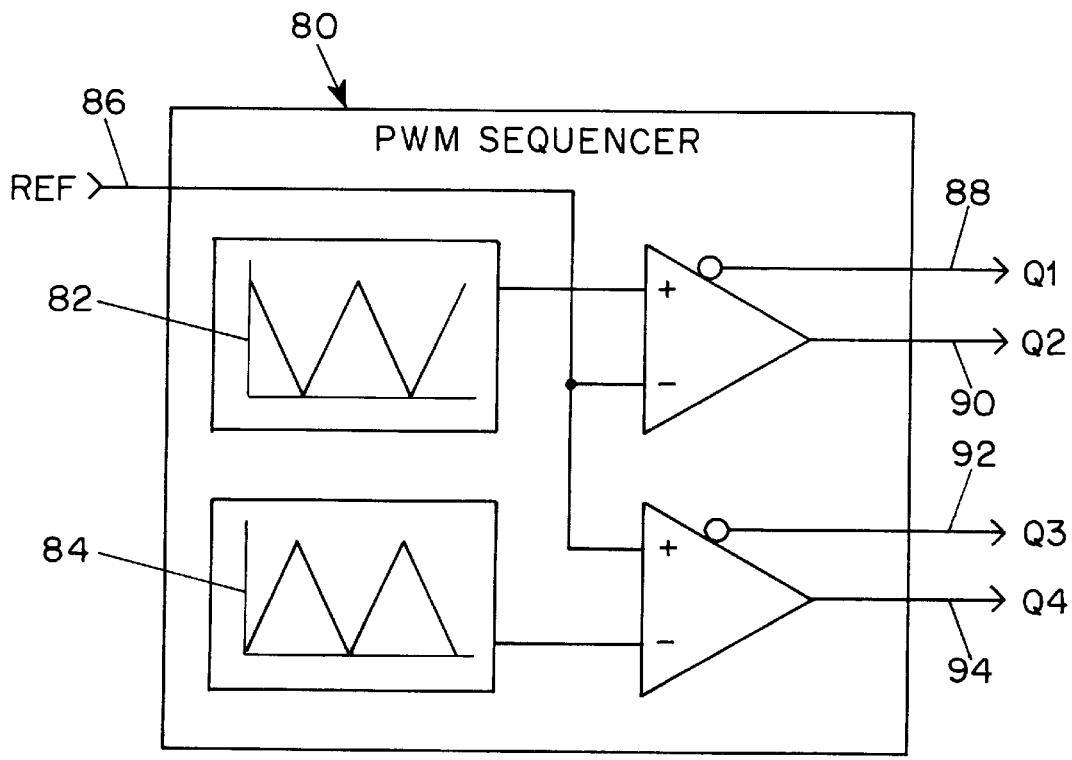
FIG. 7 is a schematic block diagram of a pulse width modulated sequencer module used to produce the gate drive signals for an H-bridge.

As shown in FIG. 7 a typical PWM sequencer module 80 has two triangle wave generators 82 and 84, a reference signal input 86 and four PWM output terminals 88, 90, 92 and 94. The three-phase sinusoidal reference is made up of three AC waveforms displaced in phase from one another by 120°. The amplitude of the signals determines, in part, the width of the PWM output signals, with a modulation index, M, normalized to 1. In this way, the reference signals can be modified by changing the index M. The three-phase sinusoidal reference can also be modulated with the injection of harmonic or non-harmonic content in such a fashion as to attenuate DC link ripple voltage, or any harmonic or non-harmonic voltage, in the output voltage waveform.

To produce a representative top level static power converter as depicted in FIG. 2, eighteen of the power modules described above, with associated PWM sequencers are interconnected to produce a three level, three-phase, two-circuit static power converter. The three series connected levels are capable of producing an end-to-end voltage of plus or minus three times the DC rail voltage. One end of each of the three static power converter phases of each circuit is connected to a single point that becomes the floating neutral point 34 within the drive, forming a star-connected (or a wye-connection for systems of three phases) three-phase, two-circuit source wherein the maximum line-to-neutral rms output voltage is $$V_{L-N} = \frac{3V_{DC}}{\sqrt{2}}(V_{rms}).$$

The resulting maximum line-to-line rms output voltage is $$V_{L-L} = \frac{3\sqrt{3}\,V_{DC}}{\sqrt{2}}(V_{rms}).$$

The motor winding configuration can be changed, depending on the power, voltage and speed requirements of the motor load. By reconfiguring the several motor windings, whether the windings are electromagnetically coupled or not, into a parallel, serial, or open arrangement, several speeds can be achieved at the same static power converter output voltage, thus raising output power to the motor load. Reconfiguration can also be performed to lower static power converter output frequency or voltage, thus lowering motor load power rating.

The external reference waveform applied to the input 86 in the illustrated example to produce the waveforms of FIGS. 9 through 16, is a three-phase 60 Hz sinusoid with modulation index M set to 0.8. The PWM frequency is 1,667 Hz and the time delay (phase shift between triangle waveforms) is calculated using the two-dimensional interleaving scheme 2 described above and provided in Table 1 below. For the static power converter described, the effective switching frequency is $f_{\mathit{eff}}=2\cdot3\cdot2\cdot1{,}667$ Hz=20 kHz.

TABLE 1

| | Time Shift (from 0°) Circuit ($\alpha_{ckt}$ = 30°) | |
|---|---|---|
| Level ($\alpha_{lvl}$ = 60°) | 1 | 2 |
| 1 | 0.0 ms | 0.5 ms |
| 2 | 0.1 ms | 0.15 ms |
| 3 | 0.2 ms | 0.25 ms |

The power circuit module component values used for simulation of this example are set forth in Table 2 for reference purposes.

TABLE 2

| Component | Value |
|---|---|
| Static power converter | |
| $C_{LINK}$ | 20,000 uF |
| $L_f$ | 400 uH |
| Motor | |
| $R_m$ | 6.9Ω |

The results of the drive system simulation of the above described example system are presented in FIGS. 9 through 16.

Figure 17:
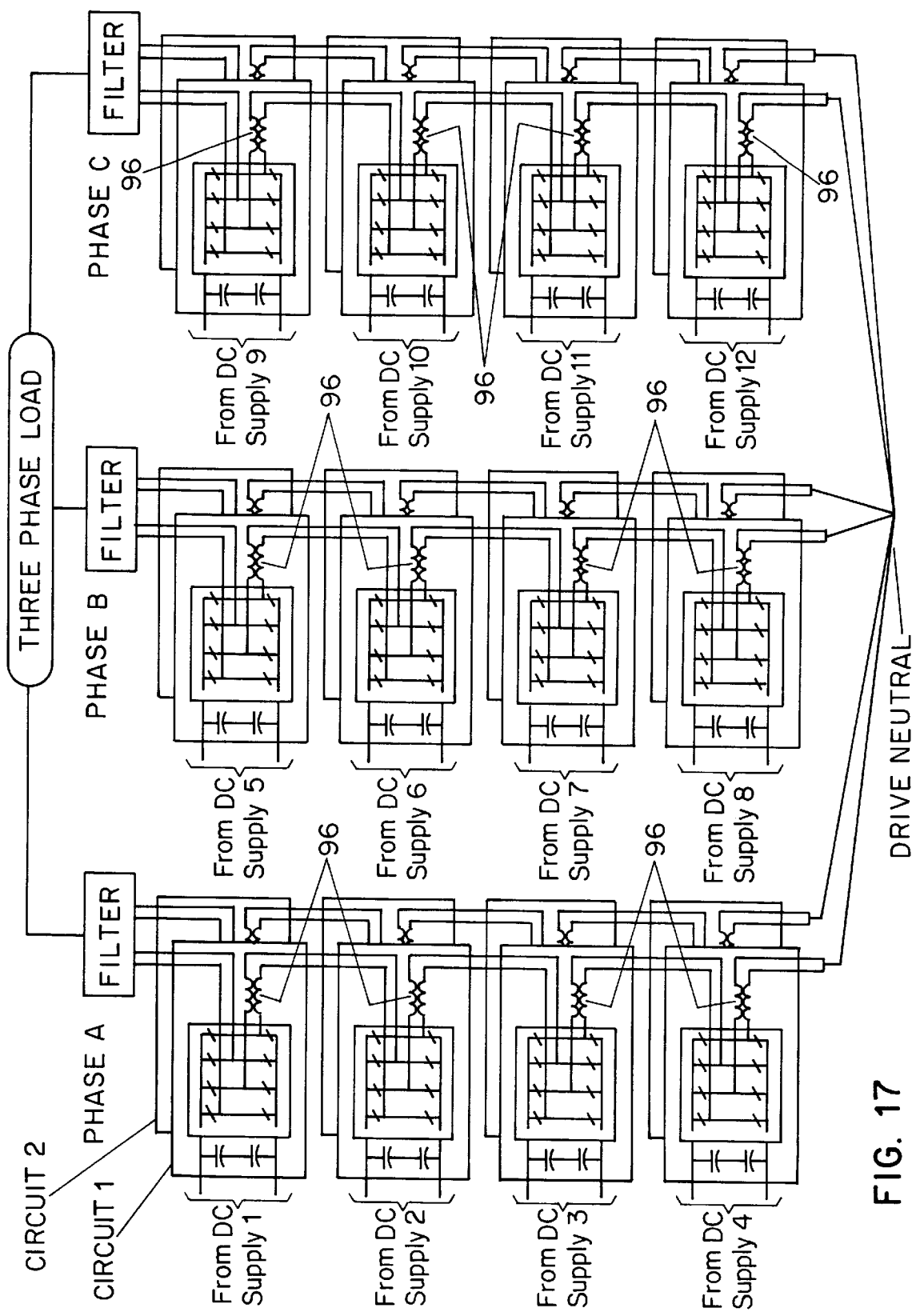
FIG. 17 is a schematic circuit diagram illustrating the circuit arrangement in another embodiment of the invention using two H-bridges combined with an interphase transformer on the output.

In an alternative embodiment, each power module of a multi-level, multi-phase, multi-circuit static power converter includes two H-bridges combined with an interphase transformer 96 on the outputs as shown in FIG. 17. The effective switching frequency produced by the static power converter is a function of the PWM frequency of the PWM carrier waveform, the number of levels, and the number of circuits according to the relationship $$f_{eff}=4lkf_{PWM}$$

where:

$f_{eff}$ is the effective switching frequency seen by the load;

$f_{PWM}$ is the carrier waveform frequency;

l is the number of series levels; and k is the number of static power converter circuits.

This embodiment results in an effective switching frequency that is twice the effective switching frequency of the preferred embodiment. The first significant harmonic is at the effective PWM switching frequency, and is easily filtered if necessary. As described in the preferred embodiment, the carrier waveforms for an individual H-bridge are a triangle wave and its complement. The carrier waveforms within each drive module, consisting of two H-bridges, are evenly distributed throughout the PWM period such that:

| | | Phase Shift (degrees) |
|---|---|---|
| H Bridge 1 | Normal Triangle | 0 |
| | Complement Triangle | 180 |
| H Bridge 2 | Normal Triangle | 90 |
| | Complement Triangle | 270 |

A normal and complementary triangle carrier waveform of the desired switching frequency are established for each H-bridge in a drive module. The triangle carriers of each level are phase shifted with respect to one another by an angle:

$$\alpha_{lvl} = \frac{360°}{4l}$$

where l is the number of levels of a multi-level phase driver. Additionally, normal and complementary triangle carriers of the desired switching frequency are established for the multi-level phase drivers of the multiple circuits such that the carrier waveform of each circuit of the level of interest is phase shifted with respect to the corresponding circuits of the same level by the angle:

$$\alpha_{ckt} = \frac{\alpha_{lvl}}{k}$$

where k is the number of static power converter circuits.

The time shifts between the PWM carrier waveforms are calculated as described in the preferred embodiment. The use of two H-bridges requires an interphase transformer to combine the dual outputs of a 4 pole module. The interphase transformer acts to double the PWM switching frequency, reduces the voltage step size to one half the DC rail voltage, and ensures precise sharing of load current between semiconductor switches. The interphase transformer 96 also provides isolation between parallel modules, which in turn reduces the number of isolated DC power supplies required by the static power converter equal to the number of module levels multiplied by the number of output phases. The dual H-bridge embodiment permits a higher module power rating, allows parallel modules to be operated from a single DC power supply, and minimizes output filtering needs.

Figure 18:
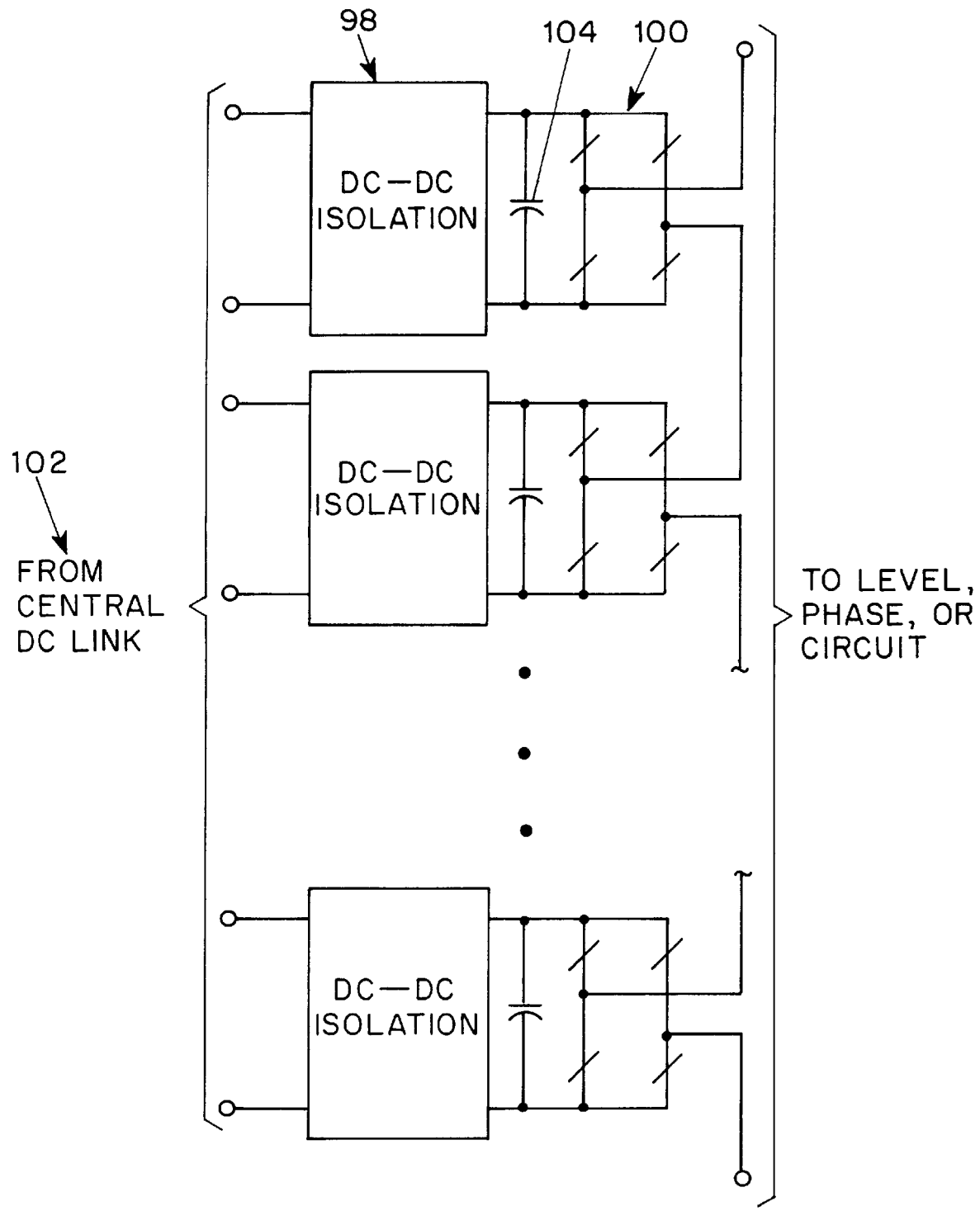
FIG. 18 is a schematic block diagram illustrating an alternative embodiment of the invention utilizing DC—DC converters.

In another alternative embodiment as shown in FIG. 18, the number of isolated DC power supplies required is reduced by providing isolation through a high frequency isolation stage 98 connected to each H-bridge 100 and powered by a central DC link 102. DC—DC conversion with electrical isolation is obtained using any of several established methods. A small DC link capacitor 104 and the H-bridge module 100 then operate in the same manner described above with reference to FIGS. 1–6 in the preferred embodiment. The static power converter levels, phases, and circuits on the load end of the static power converter are interconnected in the manner described above with respect to FIGS. 1 through 4.

In another alternative embodiment the static power converter configuration is a delta connection of multi-level phase drivers or more generally a "mesh" connection for systems of more than three phases. This embodiment requires the static power converter output of phase A to be connected to the power converter input of phase B, the output of phase B to be connected to the input of phase C, and the output of phase C to be connected to the input of phase A. The three phase output of the delta-connected power converter is then connected to the load. This option produces a lower line-to-line output voltage, resulting in higher current than the wye-connected modules and therefore requires a greater number of converter levels to produce the same output voltage for the load.

In another alternative embodiment the static power converter can be configured without a floating neutral within the static power converter, requiring the load to be wound open and each circuit of each phase of the power converter to have two connections to the load. This option increases cabling to the load, but allows phases to be controlled independently of each other.

The unlimited voltage static power converter according to the invention thus provides complete static power converter systems that exhibit very high power density, very low torque oscillation, high fidelity voltage and current waveforms, and excellent scalability for applications of foreseeable power ratings.

Although the invention has been described herein with reference to specific embodiments, many modifications and variations therein will readily occur to those skilled in the art. Accordingly, all such variations and modifications are included within the intended scope of the invention.

We claim:

1. A static power converter comprising:

at least one isolated DC power source;

an array of power converter modules connected in a multi-level, multi-phase, multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors, each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the power semiconductors which interleaves gate signals applied to the H-bridges of the array of multi-level phase drivers;

the interleaving being arranged according to an algorithm whereby normal and complementary triangle carrier waveforms of a desired switching frequency are established for each level of a multi-level phase driver, and are phase shifted with respect to each other by an angle $\alpha_{lvl}=360°/l$, where l is the number of levels of the multi-level phase driver and whereby normal and complementary triangle carrier waveforms of the desired switching frequency are established for the multi-level phase drivers of the multiple circuits such that the carrier waveform for each circuit of a level of interest is phase-shifted with respect to the corresponding circuits of the same level by the angle $\alpha_{ckt}=\alpha_{lvl}/2k$ where k is the number of static power converter circuits.

2. A static power converter comprising:

at least one isolated DC power source;

an array of power converter modules connected in a multi-level, multi-phase, multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors, each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the power semiconductors wherein the interleaving is arranged according to an algorithm whereby normal and complementary triangle carrier waveforms of a desired switching frequency are established for each level of a multi-level phase driver, and are phase shifted with respect to each other by an angle $\alpha_{lvl}=360°/2l$, where l is the number of levels of the multi-level phase driver and normal and complementary triangle carrier waveforms of the desired switching frequency are established for the multi-level phase drivers of the multiple circuits such that the carrier waveform of each circuit of the level of interest is phase-shifted with respect to the corresponding circuits of the same level by the angle $\alpha_{ckt}=\alpha_{lvl}/k$ where k is the number of static power converter circuits.

3. A static power converter comprising at least one isolated DC power source;

an array of power converter modules connected in a multi-level, multi-phase, multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the power semiconductors wherein the control means operates so as to apply normal and complementary triangle waveforms to the gates of the H-bridges and including means for producing random switching of normal and complementary triangle carrier waveforms to improve output voltage signal to noise ratio and/or eliminate the need for interleaving of carrier waveforms.

4. A static power converter according to claim 3 wherein the random switching is generated by a random PWM switching algorithm.

5. A static power converter according to claim 3 wherein the random switching is generated by a pulse density modulation switching algorithm.

6. A static power converter according to any one of claim 1, claim 2 or claim 3 wherein the multi-level phase drivers are interconnected in a star configuration.

7. A static power converter according to any one of claim 1, claim 2 or claim 3 wherein the array of multi-level phase drivers are interconnected in a mesh configuration.

8. A static power converter according to any one of claim 1, claim 2 or claim 3 wherein the array of multi-level phase drivers are configured without a common neutral.

9. A static power converter according to any one of claim 1, claim 2 or claim 3 wherein the control means includes means to shut down selected static power converter circuits and redistribute carrier waveforms so that the static power converter power rating can be partitioned in increments of 1/k, where k is the number of static power converter circuits.

10. A static power converter according to any one of claim 1, claim 2 or claim 3 wherein the control means includes means to selectively pass through static power converter levels and redistribute carrier waveforms so that the static power converter voltage rating can be partitioned in increments of 1/l, where l is the number of static power converter levels.

11. A static power converter according to any one of claim 1, claim 2 or claim 3 wherein the control means includes means to shut down selected static power converter phases so that the static power converter power rating can be partitioned in increments of 1/p where p is the number of static power converter phases.

12. A static power converter according to any one of claim 1, claim 2 or claim 3 wherein the control means includes means to shut down selected static power converter power modules and redistribute carrier waveforms using a combination of different load partitioning methods.

13. A static power converter according to any one of claim 1, claim 2 or claim 3 including an individual power source supplying a central DC link and a high frequency isolation stage connected to each H-bridge power module.

14. A static power converter according to any one of claim 1, claim 2 or claim 3 including an electromagnetic machine with isolated windings supplying power to the static power converter and wherein an isolated power supply for the individual H-bridges is provided by each isolated winding.

15. A static power converter according to any one of claim 1, claim 2 or claim 3 wherein each H-bridge includes a filter connected across output terminals producing a modular output filter.

16. A static power converter according to any one of claim 1, claim 2 or claim 3 wherein the control means includes means to sum the DC voltages in a multi-level phase driver and to modulate a common input reference signal to attenuate effective ripple voltage in the output voltage of the converter.

17. A static power converter according to any one of claim 1, claim 2 or claim 3 wherein the control means includes means to independently modulate an input reference signal to each H-bridge to attenuate link ripple voltage in the output voltage of the converter.

18. A static power converter according to any one of claim 1, claim 2 or claim 4 wherein the control means includes means to independently modulate an input reference signal to each H-bridge to attenuate any harmonic or non-harmonic voltage variations in the output voltage of the converter.

19. A static power converter according to any one of claim 1, claim 2 or claim 3 further comprising a modular dynamic braking system including a power semiconductor with an anti-parallel connected freewheeling diode and a series-connected resistor, connected across input terminals of each H-bridge, the power semiconductor of the dynamic braking system being individually operated by the control means to limit the DC voltage across the corresponding H-bridge, thereby protecting circuit components from damaging electric potentials, and the resistors in the braking system being effective to dissipate harmful energy resulting from a motor load which regenerates power into the static power converter.

20. A static power converter comprising:
(a) at least one isolated DC power source;
(b) an array of power converter modules connected in a multi-level, multi-phase, multi-circuit configuration wherein each phase comprises a plurality of circuits and each circuit comprises a parallel configuration of multi-level phase drivers; and
(c) each multi-level phase driver comprises a plurality of dual H-bridges connected in series and each dual H-bridge comprises four pairs of power semiconductors, each pair connected in series between positive and negative terminals of the same one of the plurality of isolated DC power sources;
(d) an interphase transformer connecting the midpoint nodes of two pairs of semiconductors in each dual H-bridge, the midpoint nodes of the remaining two pairs of semiconductors in each dual H-bridge being available for connection to an adjacent dual H-bridge and the output terminals of each interphase transformer being connected to an adjacent dual H-bridge; and
(e) control means for controlling the power semiconductors wherein the control means supplies carrier waveforms in the form of a triangle wave and its complement to each H-bridge and the carrier waveforms within each multi-level phase driver are evenly distributed throughout a PWM period.

21. A static power converter according to claim 20 wherein the triangle waves of each level are phase shifted with respect to each other by an angle $\alpha_{lvl}=360°/4l$ where l is the number of levels of the multi-level phase driver and normal and complementary triangle carriers of a desired switching frequency are established for the multi-level phase drivers of the multiple circuits so that the carrier waveform of each circuit of the level of interest is phase shifted with respect to the corresponding circuits of the same level by an angle $\alpha_{ckt}=\alpha_{lvl}/k$ where k is the number of static power converter circuits.

22. A static power converter according to any one of claim 20, or claim 21 wherein the multi-level phase drivers are interconnected in a star configuration.

23. A static power converter according to any one of claim 20, or claim 21 wherein the array of multi-level phase drivers are interconnected in a mesh configuration.

24. A static power converter according to any one of claim 20, or claim 21 wherein the array of multi-level phase drivers are configured without a common neutral.

25. A static power converter according to any one of claim 20, or claim 21 wherein the control means includes means to shut down selected static power converter circuits and redistribute carrier wavefornms so that the static power converter power rating can be partitioned in increments of 1/k, where k is the number of static power converter circuits.

26. A static power converter according to any one of claim 20, or claim 21 wherein the control means includes means to selectively pass through static power converter levels and redistribute carrier wavefonns so that the static power converter voltage rating can be partitioned in increments of 1/l, where l is the number of static power converter levels.

27. A static power converter according to any one of claim 20, or claim 21 wherein the control means includes means to shut down static power converter phases so that the static power converter power rating can be partitioned in increments of 1/p where p is the number of static power converter phases.

28. A static power converter according to any one of claim 20, or claim 21 wherein the control means includes means to shut down selected static power converter power modules and redistribute carrier waveforms using a combination of different load partitioning methods.

29. A static power converter system according to any one of claim 20, or claim 21 including an individual isolated power supply and a central DC link to supply power to the H-bridge modules and a high frequency isolation stage connected to each dual H-bridge power module.

30. A static power converter according to any one of claim 20, or claim 21 including an electromagnetic machine with isolated windings supplying power to the static power converter and wherein an isolated power supply for the individual H-bridges is provided by each isolated winding.

31. A static power converter according to any one of claim 20, or claim 21 wherein the control means includes means to sum the DC voltages in a multi-level phase driver and to adjust an input reference signal to attenuate effective ripple voltage in the output of the converter.

32. A static power converter according to any one of claim 20, or claim 21 wherein the control means includes means to sum the DC link voltages in a multi-level phase driver and to modulate a common input reference signal to attenuate effective ripple voltage in the output of the converter.

33. A static power converter according to any one of claim 20, or claim 21 wherein the control means includes means to independently modulate an input reference signal to each H-bridge to attenuate link ripple voltage in the output voltage of the converter.

34. A static power converter according to any one of claim 20, or claim 21 wherein the control means includes means to independently modulate an input reference signal to each H-bridge to attenuate any hanmonic or non-harmonic voltage variations in the output voltage of the converter.

35. A static power converter according to any one of claim 20, or claim 21 further comprising a modular dynamic braking system including a power semiconductor with an anti-parallel connected freewheeling diode and a series-connected resistor connected across the input terminals of each H bridge, the power semiconductors of the dynamic braking system being individually operated by the control means to limit the DC voltage across the corresponding H-bridge, thereby protecting circuit components from damaging electric potentials, and the resistors in the braking system being effective to dissipate harmful energy resulting from a motor load which regenerates power into the static power converter.

36. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multi-level, multi-phase multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors, each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the operation of the power semiconductors; and wherein the motor has separate coils driven by the power converter which are loosely coupled by nature of being in separate motor slots.

37. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of dual H-bridges connected in series and each dual H-bridge comprises four pairs of power semiconductors, each pair connected in series between positive and negative terminals of an isolated DC power source; and (c) an interphase transfonncr connecting the midpoint nodes of two pairs of semiconductors in each dual H-bridge, the midpoint nodes of the remaining two pairs of semiconductors in each dual H-bridge being available for connection to an adjacent dual H-bridge and the output terminals of each interphase transformer being connected to an adjacent dual H-bridge; and control means for controlling the operation of the power semiconductors; and wherein the motor has separate coils driven by the power converter which are loosely coupled by nature of being in separate motor slots.

38. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors, each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the operation of the power semiconductors; and wherein the motor circuit coils are driven by the power converter and are tightly coupled by nature of being in the same motor slots.

39. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of dual H-bridges connected in series and each dual H-bridge comprises four pairs of power semiconductors, each pair connected in series between positive and negative terminals of an isolated DC power source; and (c) an interphase transformer connecting the midpoint nodes of two pairs of semiconductors in each dual H-bridge, the midpoint nodes of the remaining two pairs of semiconductors in each dual H-bridge being available for connection to an adjacent dual H-bridge and the output terminals of each interphase transformer being connected to an adjacent dual H-bridge; and control means for controlling the operation of the power semiconductors; and wherein the motor has separate coils driven by the power converter which are tightly coupled by nature of being in separate motor slots.

40. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors, each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the operation of the power semiconductors; and wherein the multiple motor circuits can be reconfigured to allow operation at several motor speeds at substantially similar voltage levels, thereby producing several motor power levels.

41. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of dual H-bridges connected in series and each dual H-bridge comprises four pairs of power semiconductors, each pair connected in series between positive and negative terminals of an isolated DC power source; and (c) an interphase transformer connecting the midpoint nodes of two pairs of semiconductors in each dual H-bridge, the midpoint nodes of the remaining two pairs of semiconductors in each dual H-bridge being available for connection to an adjacent dual H-bridge and the output terminals of each interphase transformer being connected to an adjacent dual H-bridge; and control means for controlling the operation of the power semiconductors; and wherein the multiple motor circuits can be reconfigured to allow operation at several motor speeds at substantially similar voltage levels, thereby producing several motor power levels.

42. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power convertor modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of H-bridges connected in series; and each H-bridge comprises two pairs of power semiconductors, each pair connected in series between positive and negative terminals of an isolated DC power source, a midpoint node of the series-connected power semiconductors being connected to corresponding midpoint nodes in adjacent H-bridges, thereby permitting a maximum output voltage to be produced which is equal to the sum of the DC voltages applied to the bridges; and control means for controlling the operation of the power semiconductors; and wherein the multiple motor circuits can be reconfigured to allow operation at any of several motor voltages at substantially similar motor speeds.

43. A multiple circuit motor system comprising a static power converter providing a multi-circuit output and a multiple circuit motor coupled to the power converter so that the multiple motor circuits can be connected in a series, parallel or open configuration of windings according to the required motor speed, voltage and power requirements wherein the static power converter includes an array of power converter modules connected in a multilevel, multi-phase, multi-circuit configuration wherein:

(a) each phase comprises a plurality of circuits and each circuit comprises a parallel configuration of multi-level phase drivers; and (b) each multi-level phase driver comprises a plurality of dual H-bridges connected in series and each dual H-bridge comprises four pairs of power semiconductors, each pair connected in series between positive and negative terminals of an isolated DC power source; and (c) an interphase transformer connecting the midpoint nodes of two pairs of semiconductors in each dual H-bridge, the midpoint nodes of the remaining two pairs of semiconductors in each dual H-bridge being available for connection to an adjacent dual H-bridge and the output terminals of each interphase transformer being connected to an adjacent dual H-bridge; and control means for controlling the operation of the power semiconductors; and wherein the multiple motor circuits can be reconfigured to allow operation at any of several motor voltages at substantially similar motor speeds.

44. A static power converter comprising:

at least one isolated DC power source;

an array of power converter modules connected in a multi-level, multi-phase, multi-circuit configuration wherein:

(a) each phase comprises a plurality of circuits and each circuit comprises a parallel configuration of multi-level phase drivers having outputs connected in series; and (b) each multi-level phase driver comprises a plurality H-bridges connected in series; and each H-bridge comprises two pairs of power semiconductors, each pair connected in series between positive and negative terminal of an isolated DC power sources, a midpoint node of the series-connected power semiconductors being connected to corresponding midpoints in adjacent H-bridges thereby permitting a maximum output voltage to be produced which is equal to the sum of the DC voltages applied to the bridges; and control means for controlling the power semiconductors.

45. A static power converter comprising:

(a) at lease one isolated DC power source;

(b) an array of power converter modules connected in a multi-level, multi-phase, multi-circuit configuration wherein each phase comprises a plurality of circuits and each circuit comprises a parallel configuration of multi-phase drivers having outputs connected in series; and (c) each multi-level phase driver comprises a plurality of dual H-bridges connected in series and each dual H-bridge comprises four pairs of power semiconductors, each pair connected in series between positive and negative terminals of the same one of the plurality of isolated DC power sources; and (d) an interphase transformer connecting the midpoint nodes of two pairs of semiconductors in each dual H-bridge, the midpoint nodes of the remaining two pairs of semiconductors in each dual H-bridge being available for connection to an adjacent dual H-bridge and the output terminals of each interphase transformer being connected to an adjacent dual H-bridge; and (e) control means for controlling the power semiconductors.

46. A multiple circuit motor system comprising a static power converter providing a multi-circuit output and a multiple circuit motor coupled to the power converter so that the multiple motor circuits can be connected in a series, parallel or open configuration of windings according to the motor speed, voltage and power requirements.

* * * * *

UNITED STATES PATENT AND TRADEMARK OFFICE
CERTIFICATE OF CORRECTION

PATENT NO. : 5,933,339

DATED : August 3, 1999

INVENTOR(S) : Duba et al.

It is certified that error appears in the above-identified patent and that said Letters Patent is hereby corrected as shown below:

Column 1, line 44, "hanmonic" should read -- harmonic --.

Column 4, line 30, "FIG. 1 a" should read -- FIG. 1$a$ --

Column 6, line 39, "$\alpha_{ckt=} \alpha_{lvl}/2k$" should read -- $\alpha_{ckt} = \alpha_{lvl}/2k$ --.

Column 11, TABLE 1, "$\alpha_{|v|}$" should read -- $\alpha_{lvl}$ --.

Column 11, line 41, "$f_{eff}$" should read -- $f_{eff}$ --.

Column 11, line 42, "$f_{PWM}$" should read -- $f_{PWM}$ --.

Column 13, line 62, "scries-connected" should read -- series-connected --.

Column 14, line 22, "(b)" should read -- ¶(b) --.

Column 14, line 25, "semiconductors" should read -- semiconductors, --.

Column 15, line 35, "claim 4" should read -- claim 3 --.

Column 16, line 35 "wavefornms" should read -- waveforms --.

Column 17, line 15, "hanmonic" should read -- harmonic --.

Column 18, line 1, "(b)" should read -- ¶(b) --.

Column 21, line 5, "plurality" should read --plurality of--.

Column 21, line 7, "cach" should read --each--.

Column 21, line 9, "terminal" should read --terminals--.

UNITED STATES PATENT AND TRADEMARK OFFICE
CERTIFICATE OF CORRECTION

PATENT NO. : 5,933,339

DATED : August 3, 1999

INVENTOR(S) : Duba et al.

Column 21, line 9, "sources" should read --source--.

Column 21, line 15, "control" should read --¶control--.

Column 21, line 18, "lease" should read --least--.

Column 22, line 19, "converter" should read --converter--.

Signed and Sealed this

Sixteenth Day of January, 2001

Attest:

Q. TODD DICKINSON

*Attesting Officer*      *Commissioner of Patents and Trademarks*